US012141730B2

(12) United States Patent
Singh et al.

(10) Patent No.: US 12,141,730 B2
(45) Date of Patent: Nov. 12, 2024

(54) ESTIMATION OF CROP PEST RISK AND/OR CROP DISEASE RISK AT SUB-FARM LEVEL

(71) Applicant: International Business Machines Corporation, Armonk, NY (US)

(72) Inventors: Jitendra Singh, Noida (IN); Mukul Tewari, Lafayette, CO (US); Kuntal Dey, Vasant Kunj (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 163 days.

(21) Appl. No.: 16/871,794

(22) Filed: May 11, 2020

(65) Prior Publication Data
US 2021/0350295 A1    Nov. 11, 2021

(51) Int. Cl.
*G06Q 10/0635*    (2023.01)
*A01B 79/00*    (2006.01)
(Continued)

(52) U.S. Cl.
CPC ....... *G06Q 10/0635* (2013.01); *A01B 79/005* (2013.01); *G06N 20/00* (2019.01);
(Continued)

(58) Field of Classification Search
CPC .......... G06Q 10/0635; G06Q 30/0205; G06Q 30/0631; G06Q 50/02; G06N 20/00; G06V 20/188; A01B 79/005; G06T 2200/24
See application file for complete search history.

(56) References Cited

U.S. PATENT DOCUMENTS 9,563,852 B1*    2/2017  Wiles ............... A01B 79/005
9,703,275 B2*    7/2017  Ersavas ............... A01G 25/16
(Continued)

FOREIGN PATENT DOCUMENTS

CN    102523245 A    6/2012
CN    108197794 A    6/2018
(Continued)

OTHER PUBLICATIONS

Tonnang et al., "Advances in crop insect modelling methods—Towards a whole system approach", Ecological Modelling, vol. 354, 2017, pp. 88-103.
(Continued)

*Primary Examiner* — Rutao Wu
*Assistant Examiner* — Stephen S Swartz
(74) *Attorney, Agent, or Firm* — Elliot J. Shine

(57) ABSTRACT

Method, apparatus, and computer program product are provided for estimating crop pest risk and/or crop disease risk at sub-farm level. In some embodiments, a farm region is determined based on farm definition data, and input data associated with the farm region are retrieved from a plurality of data sources. The input data may include a plurality of pixel sets. In some embodiments, for each pixel set, crop risk data are determined based on the input data using one or more spatiotemporal regression models. The crop risk data may include an estimate of crop pest risk and/or crop disease risk for each pixel set. In some embodiments, the farm region is categorized into a plurality of sub-farms each defining a risk level category for that sub-farm based on the crop risk data. In some embodiments, the sub-farms are displayed as a visual heat-map, along with recommended antidote options.

24 Claims, 12 Drawing Sheets

(51) Int. Cl.
| | |
|---|---|
| G06N 20/00 | (2019.01) |
| G06Q 30/0204 | (2023.01) |
| G06Q 30/0601 | (2023.01) |
| G06Q 50/02 | (2012.01) |
| G06T 11/00 | (2006.01) |
| G06V 20/10 | (2022.01) |

(52) U.S. Cl.
CPC ..... *G06Q 30/0205* (2013.01); *G06Q 30/0631* (2013.01); *G06Q 50/02* (2013.01); *G06T 11/001* (2013.01); *G06V 20/188* (2022.01); *G06T 2200/24* (2013.01)

(56) References Cited

U.S. PATENT DOCUMENTS

| | | | | |
|---|---|---|---|---|
| 2006/0282295 | A1* | 12/2006 | McComb | G06Q 50/02 705/4 |
| 2011/0035246 | A1* | 2/2011 | Fithian | G06Q 50/02 705/400 |
| 2012/0237083 | A1* | 9/2012 | Lange | G06F 16/29 382/103 |
| 2014/0058881 | A1* | 2/2014 | Rosenbaum | G06Q 30/0631 705/26.7 |
| 2016/0055593 | A1 | 2/2016 | Groeneveld | |
| 2016/0078375 | A1 | 3/2016 | Ethington et al. | |
| 2016/0078569 | A1* | 3/2016 | Ethington | G06Q 10/04 705/7.37 |
| 2016/0217228 | A1 | 7/2016 | Mewes et al. | |
| 2016/0217229 | A1 | 7/2016 | Mewes et al. | |
| 2016/0232621 | A1* | 8/2016 | Ethington | A01B 79/02 |
| 2018/0035605 | A1* | 2/2018 | Guan | G06V 20/188 |
| 2018/0129175 | A1* | 5/2018 | Jennings | A01G 25/16 |
| 2018/0260947 | A1 | 9/2018 | Mannar et al. | |
| 2018/0330435 | A1* | 11/2018 | Garg | G06Q 40/025 |
| 2019/0050948 | A1 | 2/2019 | Perry et al. | |
| 2019/0108631 | A1* | 4/2019 | Riley | G06T 7/0004 |
| 2019/0156255 | A1* | 5/2019 | Carroll | G06Q 10/067 |
| 2019/0179009 | A1* | 6/2019 | Klein | G01S 13/9023 |
| 2019/0179982 | A1* | 6/2019 | Reese | G06F 30/20 |
| 2019/0188847 | A1* | 6/2019 | Gonzalez | G06V 20/17 |
| 2019/0228224 | A1* | 7/2019 | Guo | G06N 3/08 |
| 2020/0364456 | A1* | 11/2020 | Tran | G06Q 50/02 |
| 2020/0364843 | A1* | 11/2020 | Stueve | G06V 10/764 |
| 2021/0173119 | A1* | 6/2021 | Singh | G05D 1/0027 |
| 2022/0067614 | A1* | 3/2022 | Guan | G06T 7/97 |

FOREIGN PATENT DOCUMENTS

| | | |
|---|---|---|
| EP | 3046066 B1 | 2/2019 |
| JP | 2010-009163 A | 1/2010 |
| JP | 2015-119646 A | 7/2015 |
| WO | 2013063106 A2 | 5/2013 |
| WO | 2017131809 A1 | 8/2017 |
| WO | 2019046203 A1 | 3/2019 |
| WO | 2021229360 A1 | 11/2021 |

OTHER PUBLICATIONS

Olatinwo et al., "Chapter 4—Weather-based Pest Forecasting for Efficient Crop Protection", Integrated Pest Management—Current Concepts and Ecological Perspective, 2014, pp. 59-78.

Unknown, "Pestpredict", 2 pages, downloaded from <http://www.ncipm.res.in/NCIPMPDFs/folders/3Pestpredict.pdf> on Jan. 6, 2020.

Unknown, "Computer Centre for Agricultural Pest Forecasting (CIPRA)", 8 pages, printed from <http://www.agr.gc.ca/eng/science-and-innovation/agricultural-research-results/computer-centre-for-agricultural-pest-forecasting-cipra/?id=1376403227682> on Jan. 6, 2020.

Kumar, Amrender, "Weather Based Forewarning Models for Pests & Diseases and Yield Loss Assessment", 7 pages, downloaded from <https://pdfs.semanticscholar. org/30e7/21a380c9e0b3b992eb21c2531e1c4594dad2.pdf_ga=2.83294544.735035124.1586365771-19348411.1586365771> on Jan. 7, 2020.

Misra et al., "Forewarning powdery mildew caused by Oidium mangiferae in mango (Mangifera indica) using logistic regression models", Indian Journal of Agricultural Sciences, vol. 74, No. 2, Feb. 2004, pp. 84-87.

Badnakhe et al., "Evaluation of Citrus Gummosis disease dynamics and predictions with weather and inversion based leaf optical model", Computers and Electronics in Agriculture, vol. 155, 2018, pp. 130-141.

Darvishzadeh et al., "Inversion of a Radiative Transfer Model for Estimation of Rice Canopy Chlorophyll Content Using a Lookup-Table Approach", IEEE Journal of Selected Topics in Applied Earth Observations and Remote Sensing, vol. 5, No. 4, Aug. 2012, pp. 1222-1230.

Ramasubramanian V., "Forecasting Techniques in Agriculture", 15 pages, downloaded from <https://pdfs.semanticscholar.org/c59f/94d8356d0a192222a2be729cf185ac541bf5.pdf> on Feb. 12, 2020.

Agrawal et al., "Weather Based Forecasting of Crop Yields, Pests and Diseases—IASRI Models", Journal of the Indian Society of Agricultural Statistics, vol. 61, No. 2, 2007, pp. 255-263.

Li et al., "The Study of Crop Pest Forecasting Using GP", International Journal of Information Technology, vol. 11, No. 10, 2005, pp. 37-44.

Nietschke et al., "A developmental database to support insect phenology models", Crop Protection, vol. 26, 2007, pp. 1444-1448.

Magarey et al., "NAPPFAST: an Internet system for the weather-based mapping of plant pathogens", Plant Disease, vol. 91, No. 4, Apr. 2007, pp. 336-345.

Jones et al., "The DSSAT cropping system model", European Journal of Agronomy, vol. 18, 2003, pp. 235-265.

Unknown, "Modular Approach", 14 pages, printed from <https://dssat.net/models-and-applications/modular-approach-example> on Aug. 9, 2019.

Mell et al., "The NIST Definition of Cloud Computing", National Institute of Standards and Technology, NIST Special Publication 800-145, Sep. 2011, 7 pages.

ISR/WO (International Search Report/Written Opinion) in International Application No. PCT/IB2021/053724 dated Aug. 12, 2021.

Neog et al., "A Forewarning Model for Mustard Aphid on Real Time Basis", Journal of Agricultural Physics, vol. 4, No. 1 & 2, 2004, pp. 44-50.

Examination Report No. 1 for Standard Patent Application, Australian Government, IP Australia, Application No. 2021270888, Dated Aug. 7, 2023.

Australian Government IP Australia, "Examination report No. 3 for standard patent application" Jul. 24, 2024, 4 Pages, AU Application No. 2021270888.

Japan Patent Office, "Notice of Reasons for Refusal" Jul. 16, 2024, 8 Pages, JP Application No. 2022-566299.

* cited by examiner

ESTIMATION OF CROP PEST RISK AND/OR CROP DISEASE RISK AT SUB-FARM LEVEL

BACKGROUND

The present invention relates in general to the field of crop monitoring. More particularly, the present invention relates to estimating crop pest risk and/or crop disease risk at sub-farm level using one or more spatiotemporal regression models.

SUMMARY

Embodiments of the present disclosure include a method, apparatus, and computer program product for estimating crop pest risk and/or crop disease risk at sub-farm level. In some embodiments, farm definition data are received, a farm region is determined based on the farm definition data, and input data associated with the farm region are retrieved from a plurality of data sources. The input data may include a plurality of pixel sets. In some embodiments, for each of the plurality of pixel sets, crop risk data are determined based on the input data using one or more spatiotemporal regression models to simulate crop pest risk and/or crop disease risk over space and time. The crop risk data may include an estimate of crop pest risk for each of the plurality of pixel sets and/or an estimate of crop disease risk for each of the plurality of pixel sets. In some embodiments, the farm region is categorized into a plurality of sub-farms each defining a risk level category for that sub-farm based on the crop risk data. In some embodiments, one or more of the plurality of sub-farms are displayed as a visual heat-map. In some embodiments, one or more recommended antidote options are displayed as text associated with each sub-farm on the visual heat-map.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
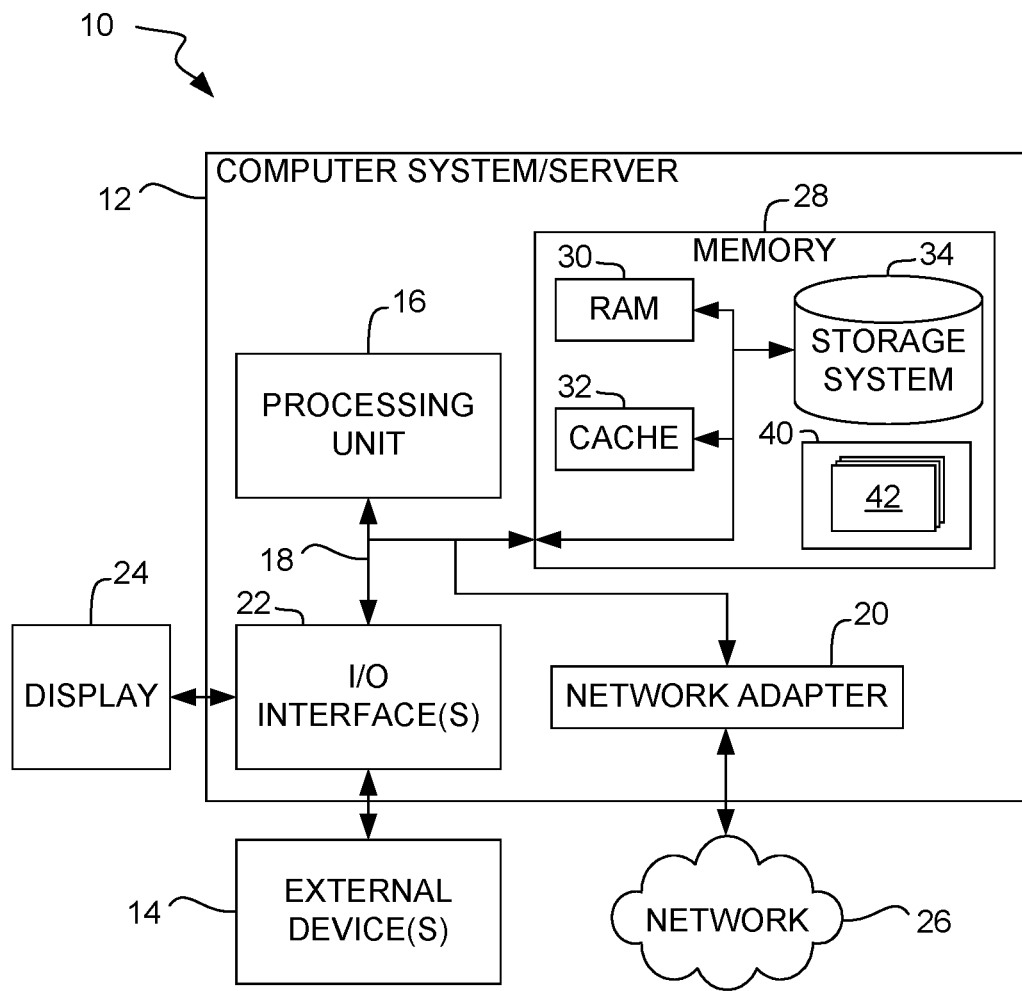
FIG. 1 depicts a cloud computing node, according to one or more embodiments.

Crop monitoring is utilized extensively by farmers and agribusiness, as well as by government. For example, agribusinesses such as commodity trading, seed supply, pesticide manufacturing, and logistic services use crop monitoring in various aspects of their businesses. Crop monitoring also finds use in many governmental functions, including policy management.

Crop monitoring exists in myriad forms. Satellite crop monitoring, for example, facilitates real-time crop vegetation index monitoring of an area of interest (e.g., one or more fields) through the use of spectral analysis of high resolution satellite imagery. Crop monitoring is often utilized to answer questions related to crop development, such as "What is the sowing status during the on-going crop season (i.e., how much area has undergone sowing already)?" and "What amount of crop acreage is under different crops?".

Crop monitoring is also utilized in the context of crop pest and disease (P&D) management. Crop P&D management includes both pest and disease observation (i.e., what has already happened) and pest and disease risk forecasting (i.e., what might happen). Crop pest and disease risk forecasting may be performed at farm scale, i.e., the farm is considered a single unit for prediction. For example, pest and disease risk may be predicted at farm level using weather conditions (e.g., in conventional pest and disease risk forecasting, temperature grids are typically used to determine temperature values and precipitation grids are typically used to determine precipitation values), pest and disease dynamics, and one or more crop growth simulation models. Temperature grids are typically square physical regions, typically 2.5 miles by 2.5 miles. Precipitation grids are similar to temperature grids in their purposes and characteristics. The best resolution that can be achieved in such conventional pest and disease risk forecasting is the resolution of the grid of weather data. As a result, remedial activity to address predicted pest and disease risk, as determined by conventional pest and disease risk forecasting, is performed across the whole farm.

However, pest and disease risk is typically not uniform across a whole farm. Rather, pest and disease risk is dependent upon sub-farm factors, such as weather conditions (e.g., wind speed, temperature, dew point, humidity, etc.), soil moisture and soil characteristics (e.g., soil type, soil health, soil composition, etc.), irrigation and elevation/slope for water flow, fertilizer application, historical record of pest management, sowing date, seed variety used, and type of machines/equipment used and their sterilization. In addition, pest and disease risk is dependent upon the P&D risk of neighboring farms. For example, neighboring farms with high risk can cause high risk to at least nearby portions of an adjacent farm.

As used herein, the terms "farm" or "farm region" refer to any amount of land in any shape or size. For instance, a farm or a farm region can refer to a grower's entire property (or one or more portions thereof), one or more fields, one or more plots of land, one or more planting regions, one or more zones, one or more management zones, and the like.

As used herein, the term "farm definition data" refers to field identifiers, geographic identifiers, boundary identifiers, crop identifiers, and any other suitable data that may be used to identify farm land. For instance, farm definition data may include, but are not limited to, a Common Land Unit (CLU), a farm number, a farm serial number (FSN), a field number, a lot and block number, a parcel number, a range, a section, a township, a tract number, geographic boundaries, and/or geographic coordinates. A CLU, according to the United States Department of Agriculture (USDA) Farm Service Agency, is the smallest unit of land that has a permanent, contiguous boundary, a common land cover and land management, a common owner and a common producer in agricultural land associated with USDA farm programs. CLU boundaries are delineated from relatively permanent features such as fence lines, roads, and/or waterways. The USDA Farm Service Agency maintains a Geographic Information Systems (GIS) database defining CLUs for farms in the United States. The CLU GIS data layer includes all farm fields, managed forested tracks, range land, pasture land, and other managed areas.

In accordance with some embodiments of the present invention, a method, apparatus, and computer program product are provided for estimating crop pest risk and/or crop disease risk at sub-farm level. In some embodiments, farm definition data are received, a farm region is determined based on the farm definition data, and input data associated with the farm region are retrieved from a plurality of data sources. In some embodiments, the input data may include a plurality of pixel sets (i.e., a "pixel set" includes at least one pixel), with each pixel set defining the smallest possible/permissible resolution of the farm from which data can be meaningfully collected. A number of advantages flow from estimating crop pest risk and/or disease risk at sub-farm level including, but not limited to, reducing cost of pest management by controlling pesticide application at sub-farm scale; maintaining crop quality without excessive use of pesticides; and reducing environmental concerns related to excessive use of pesticides.

The smallest unit of the sub-farm for which the crop pest risk and/or crop disease risk is computed, in accordance with some embodiments, is a given pixel of the farm. More practically, however, the smallest unit of the sub-farm for which the crop pest risk and/or crop disease risk is computed, in accordance with some embodiments, is the smallest possible/permissible resolution (i.e., referred to herein as a "pixel set") of the farm from which data can be meaningfully collected.

In some embodiments, farm definition data are received, a farm region is determined based on the farm definition data, and input data associated with the farm region are retrieved from a plurality of data sources. The retrieved input data may include a plurality of pixel sets. In some embodiments, for each of the plurality of pixel sets, crop risk data are determined based on the input data using one or more spatiotemporal regression models (e.g., for each of one or more given crops, at least one machine learning (ML)/crop phenology/pest(disease)-propagation model for each of one or more pests and/or one or more diseases that may affect that given crop) to simulate crop pest risk and/or crop disease risk over space and time. The crop risk data may include an estimate of crop pest risk for each of the plurality of pixel sets and/or an estimate of crop disease risk for each of the plurality of pixel sets. In some embodiments, the farm region is categorized into a plurality of sub-farms each defining a risk level category (e.g., high risk, medium risk, low risk, or no risk) for that sub-farm based on the crop risk data.

For each pixel set within the farm, a function may be deployed to compute the risk of crop pest and/or crop disease infection of that pixel set. The input to this function may include, but is not limited to, attributes such as weather conditions (e.g., wind speed and direction, temperature, dew point, humidity, solar radiation, and other relevant conditions); soil moisture and soil characteristic variations; fertilizer application; irrigation and elevation/slope of land for water flow; historical record of pest management activities such as the number of infections and average infection duration; number of adjoining areas infected and a function of the total incoming wind volume, wind distance, and intensity of the nearest infected area in the direction from which the wind is arriving; and the like. A model may be learned as a function of the features above. For example, using historical data available for the feature values, as well as the observed infection intensity, a regression model may be learned (e.g., using support vector regression (SVR), logistic regression, or deep neural regressors) and the regression model can be applied on the testing instance. The output of the model may be a value (e.g., a decimal number between 0 and 1, an integer between 0 and 100, etc.) that denotes the expected intensity of infection (risk) at a given time. In some embodiments, the output of the model may be an array of tuples containing the value of risk over time (expected intensity of infection). The above process may be repeated over different blocks of time, thereby creating a complete temporal risk map, along with the spatial dimension of the risk map, and the prediction may be repeated at finite time intervals to re-calibrate.

In some embodiments, one or more of the plurality of sub-farms are displayed as a high resolution risk map (e.g., a visual heat-map). In some embodiments, the high resolution risk map may be updated for continuous monitoring and maintaining crop health.

In some embodiments, a reporting engine reports a high resolution P&D risk map time series at various levels of resolution as chosen by the user. In some embodiments, a reporting engine may dynamically vary the resolution within the farm (i.e., the "sub"-level of the "sub-farm"), including providing a recommended level of resolution for a given P&D situation. In some embodiments, the user may choose whether or not to override this recommended resolution level. For example, the reporting engine may generate data that may be displayed as a visual map (e.g., a visual heat-map) of different risk level zones (each of which is also referred to as a "sub-farm") of the farm, wherein the size of the sub-farm may be chosen based upon a combination of the recommended resolution level and a user's choice.

In some embodiments, one or more recommended antidote options are displayed as text associated with each sub-farm on the high resolution risk map. For example, the one or more recommended antidote options may take the form of different dosages of antidotes for different sub-farms within the farm, at different times, for best protection of the cultivation (that is, temporally planned antidotes), which may also additionally accept the grower's planned plantation type (e.g., the grower may have planned an "organic" plantation type) for fine-tuning the antidotes.

In some embodiments, one or more regression models are used to generate a risk map at sub-farm scale taking into account sub-farm scale variations within the farm. Input data used by the one or more regression models may include farm level and sub-farm level features. Examples of input data that may be used by the one or more regression models include, but is not limited to, the following: high resolution geospatial data (e.g., elevation, soil moisture (SM), remote sensing, etc.); and field specific information on soil characteristics, sowing date, irrigation, fertilizer and pesticide application, machines/equipment sterilization, etc.; as well as, optionally, a course resolution P&D risk profile of an area typically available at a spatial resolution of weather forecasts. For example, a course resolution P&D risk profile at farm scale may be obtained from IBM Watson Decision Platform for Agriculture or other similar systems. IBM® and IBM Watson® are registered trademarks of International Business Machines Corporation ("IBM") in the United States.

Data to train such models (i.e., one or more regression models) are increasingly becoming available and may be collected via satellites, aerial drones, aircraft, IoT sensors (e.g., mounted on farm equipment, such as seed drills and sprayers), remote sensors (e.g., mounted in-the-field), field images from hand-held devices and ground-based robots, crowdsourcing, and the like.

An emerging information technology (IT) delivery model is cloud computing, by which shared resources, software, and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar, and/or collaboration infrastructure in the cloud, and an end user would use an appropriate client to access his or her email, or perform a calendar operation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 18 by one or more data media interfaces. As will be further described below, memory 28 may include a computer program product storing a set (e.g., at least one) of program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 are adapted to generally carry out the one or more functions and/or methodologies of one or more embodiments.

Computer system/server 12 may also communicate with one or more external devices 14 such as a keyboard, a pointing device, a display 24, etc.; one or more devices that enable a user to interact with computer system/server 12; and/or any device (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, the network adapter 20 communicates with other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
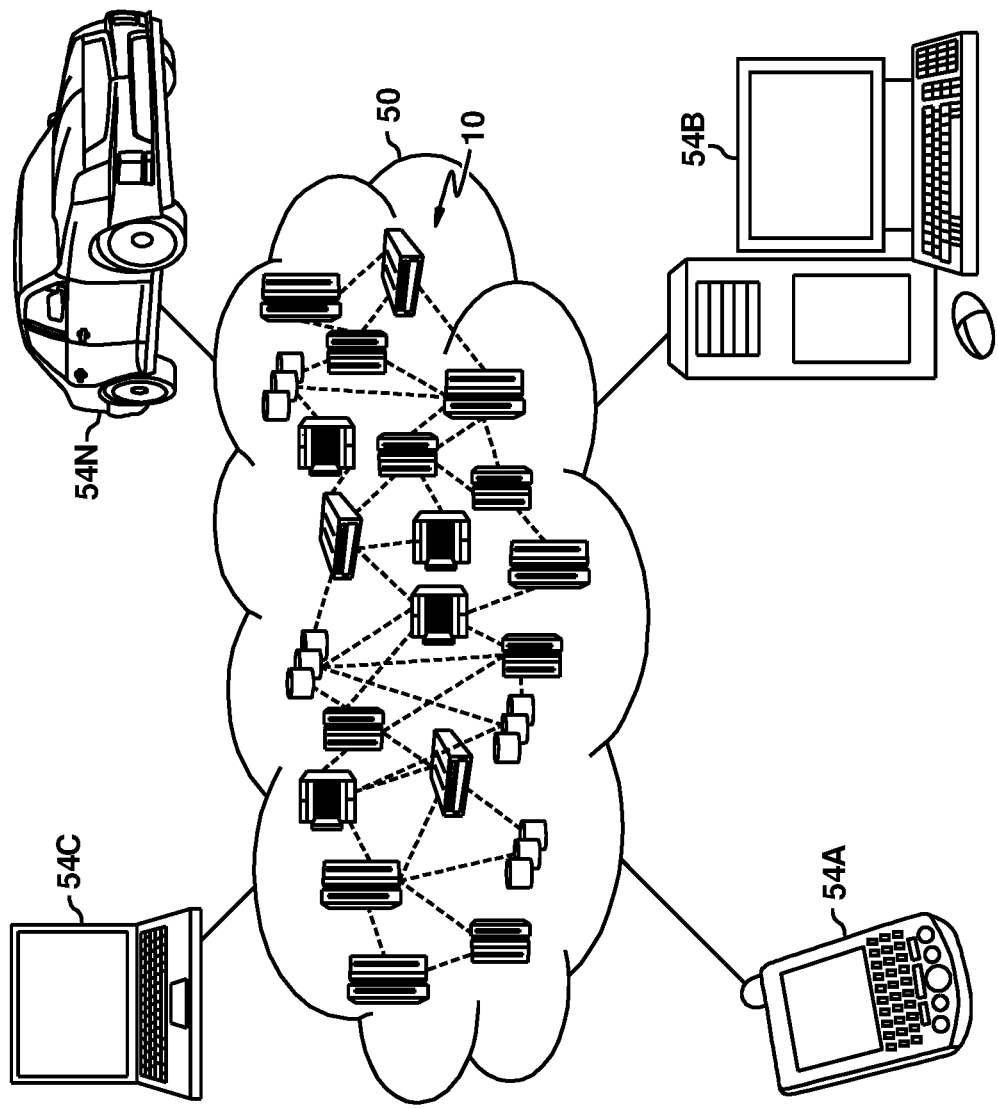
FIG. 2 depicts a cloud computing environment, according to one or more embodiments.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
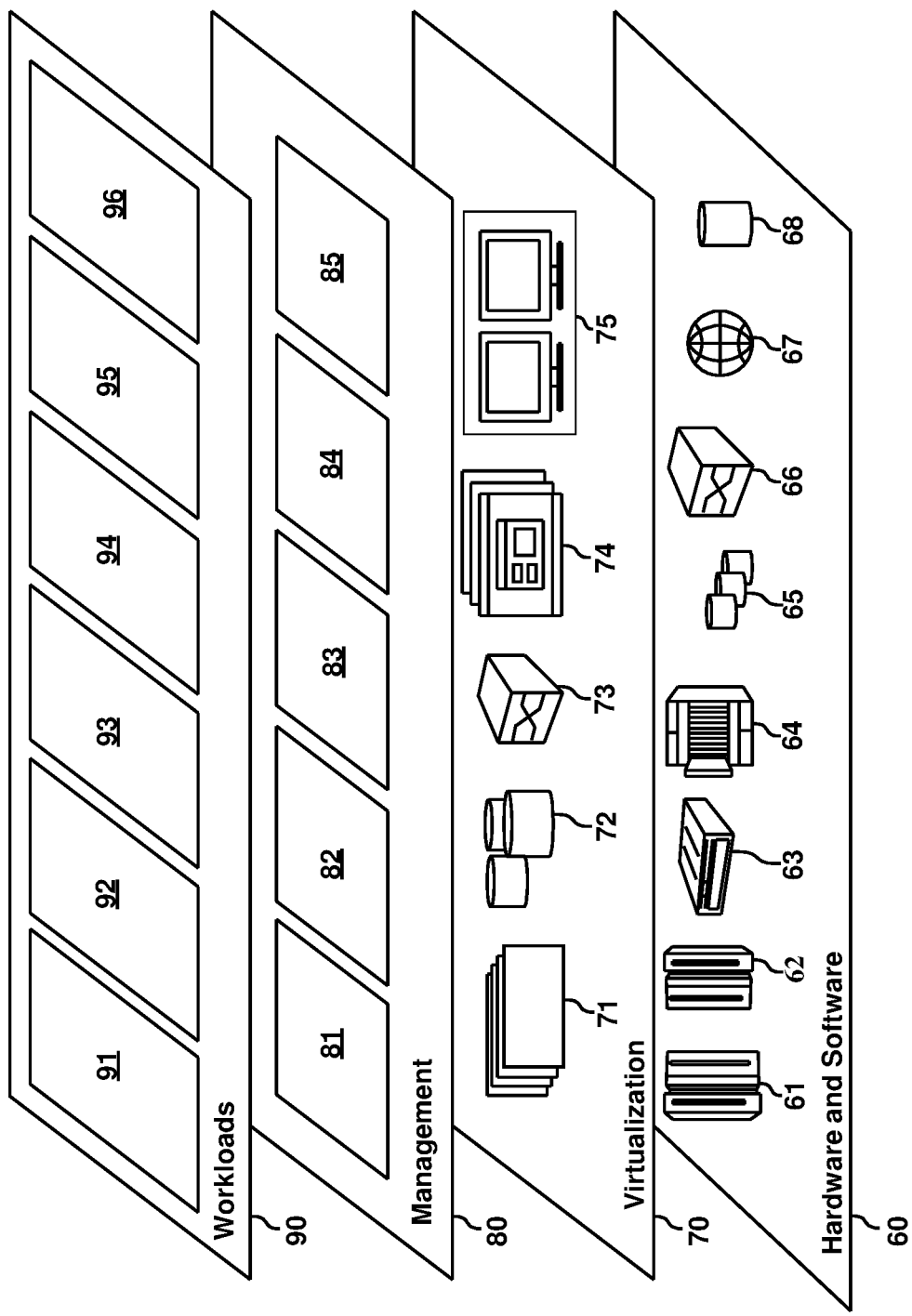
FIG. 3 depicts abstraction model layers, according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and estimation of crop pest risk and/or crop disease risk 96.

Figure 4:
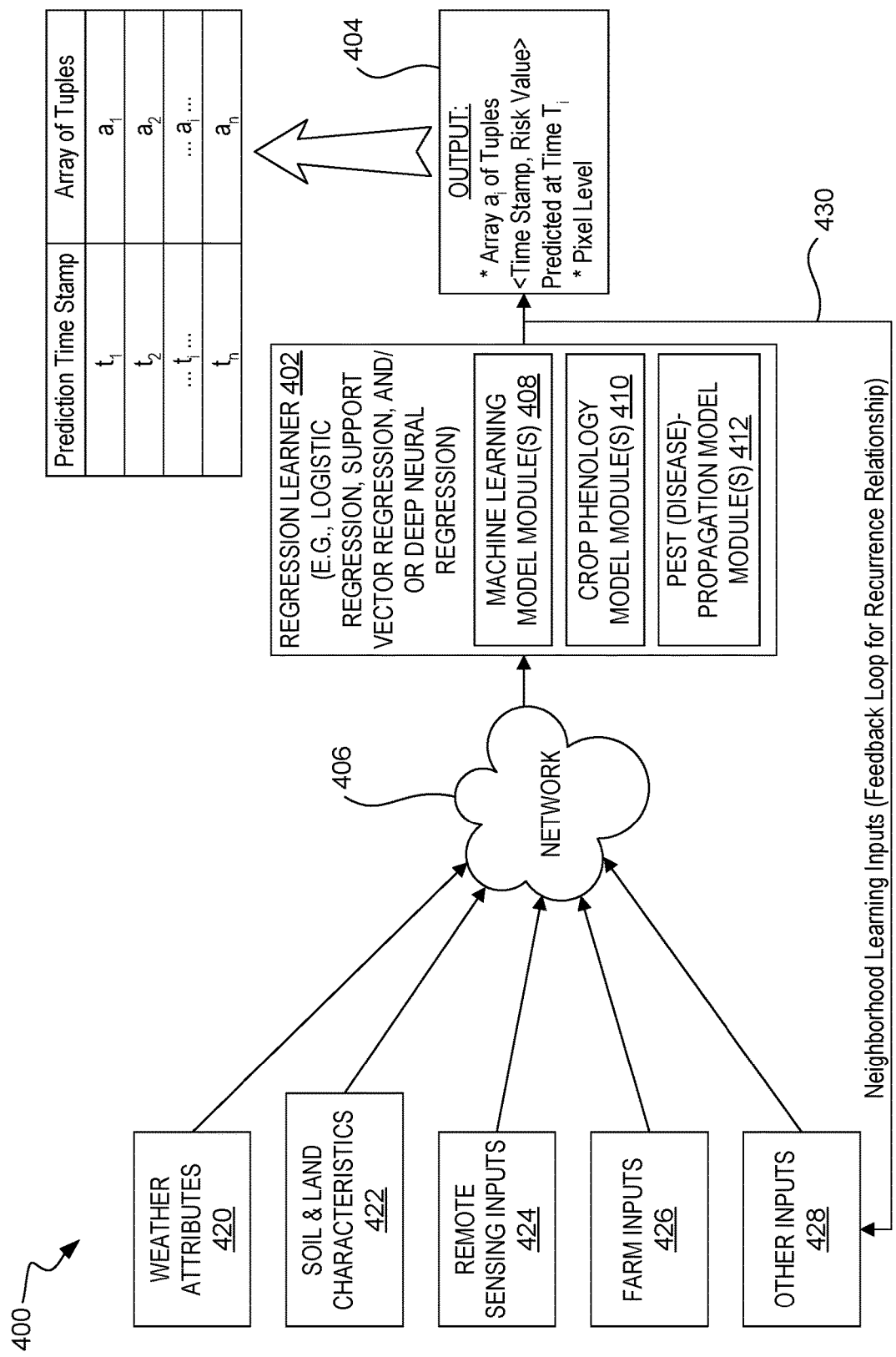
FIG. 4 depicts an exemplary system for estimation of crop pest risk and/or crop disease risk at sub-farm level, an output (e.g., pixel level) of which includes a time series of arrays ($a_0, a_1, a_2, \ldots, a_n$) each of which may constitute an array $a_i$ of tuples<Time Stamp, Risk Value> predicted at time $t_i$, according to one or more embodiments.

Referring now to FIG. 4, an exemplary system 400 for estimation of crop pest risk and/or crop disease risk at sub-farm level is depicted, in accordance with one or more embodiments. The exemplary system 400 illustrated in FIG. 4 includes a regression learner 402, an output 404 (e.g., pixel level) of which includes crop risk data. The crop risk data determined by the regression learner 402 may include a time series of arrays $(a_1, a_2, \ldots, a_n)$ each of which may constitute an array $a_i$ of tuples<Time Stamp, Risk Value> predicted at time $t_i$. For example, the output 404 of the regression learner 402 may include an array $a_1$ of tuples<Time Stamp=$t_1$, Risk Value$_{t1}$>predicted at time $t_1$, an array $a_2$ of tuples<Time Stamp=$t_2$, Risk Value$_{t2}$> predicted at time $t_2$, ..., and an array $a_n$ of tuples<Time Stamp=$t_n$, Risk Value$_{tn}$> predicted at time $t_n$. Each tuple corresponds with a "pixel set" of the farm. The regression learner 402 may employ machine learning to learn one or more spatiotemporal regression models to simulate crop pest risk and/or crop disease risk over space and time. In some embodiments, for each of one or more given crops, at least one machine learning (ML)/crop phenology/pest (disease)-propagation model may be trained over a set of training data for each of one or more pests and/or one or more diseases which may affect that given crop. The regression learner 402 may, for example, employ logistic regression, support vector regression, and/or deep neural regression to learn the one or more regression models. Once the one or more regression models is/are learned, the regression learner 402 may apply the one or more regression models to data that the regression learner 402 has not seen before (e.g., data from a testing instance), and make predictions about those data.

The output 404 of the regression learner 402 may be "pixel level" or, more generally, "pixel set level". A "pixel set" (at least one pixel) refers to the smallest possible/permissible resolution of the farm from which data can be meaningfully collected. In some embodiments, the output 404 is pixel level in the sense that each tuple<Time Stamp, Risk Value> in the array $a_i$ of tuples predicted at time $t_i$ corresponds to a pixel of the farm. In such embodiments, Risk Value is predicted for each pixel of the farm. In some embodiments, the output 404 is "pixel set level" in the sense that each tuple<Time Stamp, Risk Value> in the array $a_i$ of tuples predicted at time $t_i$ corresponds to a pixel set of the farm. In such embodiments, Risk Value is predicted for each pixel set of the farm.

Data may be provided to the regression learner 402 over one or more networks 406 and may be pixel level, pixel set level, and/or one or more relatively courser resolutions, such as farm level. Such networks 406 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Mal, WLAN, radio communication, microwave communication, satellite communication, optical communication, sonic communication, electromagnetic induction communication, quantum communication, and/or any other suitable communication technology.

In the exemplary system 400 illustrated in FIG. 4, the regression learner 402 includes one or more machine learning model modules 408, one or more crop phenology model modules 410, and one or more pest (disease)-propagation model modules 412. The one or more machine learning model modules 408, the one or more crop phenology model modules 410, and/or the one or more pest (disease)-propagation model modules 412 may be separate components as shown in the exemplary system 400 illustrated in FIG. 4, or may be combined in total or in part.

In some embodiments, the regression learner 402 may include one or more data source ingest modules and/or one or more data assimilation modules. For example, input data may be ingested into the one or more machine learning model modules 408, the one or more crop phenology model modules 410, and/or the one or more pest (disease)-propagation model modules 412 via a data source ingest module.

The one or more machine learning model modules 408 may reason over and learn from training data to provide one or more algorithms (e.g., one or more "regression models"). For example, to learn the one or more regression models, the one or more machine learning model modules 408 may employ logistic regression, support vector regression, and/or deep neural regression with respect to historical data (e.g., one or more weather attributes 420, one or more soil and land characteristics 422, one or more remote sensing inputs 424, one more farm inputs 426, and/or one or more other inputs 428, such as neighborhood information on pests and/or diseases) for the farm over the one or more networks 406, as well as data output from one or more crop phenology model modules 410 and/or data output from the one or more pest (disease)-propagation model modules 412.

Logistic regression models, for example, can quite aptly capture the behavior of crop pests and/or crop diseases in the form of algorithms that express the relationship between one or more predictor variables (e.g., one or more weather attributes 420, one or more soil and land characteristics 422, one or more remote sensing inputs 424, one more farm inputs 426, and/or one or more other inputs 428, such as neighborhood information on pests and/or diseases) and a dichotomous response variable, i.e., probability of occurrence of epidemic, wherein 0=no epidemic, 1=epidemic. This probability of occurrence of epidemic is referred to as "risk" (i.e., crop pest risk and/or crop disease risk).

Once the one or more regression models is/are learned, the one or more machine learning model modules 408 may apply the one or more regression models to data that the one or more machine learning model modules 408 has/have not seen before, and make predictions about those data. For example, the one or more machine learning model modules 408 may apply the one or more regression models to historical, current, and/or forecast data for the farm (e.g., the one or more weather attributes 420, the one or more soil and land characteristics 422, the one or more remote sensing inputs 424, the one or more farm inputs 426, and/or the one or more other inputs 428, such as neighborhood information on pests and/or diseases) received over the one or more networks 406, as well as data output from one or more crop phenology model modules 410 and/or data output from the one or more pest (disease)-propagation model modules 412.

The one or more weather attributes 420 may include, but are not limited to, temperature, humidity, dew point, wind speed and direction, precipitation, and the like.

The one or more soil and land characteristics 422 may include, but are not limited to, soil type, soil composition, soil health, soil depth, soil moisture, irrigation and land elevation/slope for water flow, and the like.

The one or more remote sensing inputs 424 may include, but are not limited to, vegetation indices, backscattering, and the like. In some embodiments, the remote sensing inputs 424 may be provided by one or more remote sensor databases (e.g., 1126 in FIG. 11) or a geospatial data platform, such as IBM® PAIRS (Physical Analytics Integrated Data Repository and Services)-Geoscope. IBM® is a registered trademark of International Business Machines Corporation ("IBM") in the United States. IBM® PAIRS-Geoscope is a platform, specifically designed for massive geospatial-temporal data (maps, satellite, weather, drone, IoT), query and analytic services. IBM® PAIRS-Geoscope provides access to historical and continuously updated remote sensor data.

The one or more farm inputs 426 may include, but are not limited to, plantation information such as crop type, seed variety used, sowing date, etc.; fertilizer application; irrigation; historical record of pest management such as pesticide application, herbicide application, fungicide application, etc.; and the like.

The one or more other inputs 428 may include, but are not limited to, farm management inputs, such as the type of machines/equipment used and their sterilization; neighborhood information on pests and/or diseases; and the like.

In some embodiments, the one or more sets of training data used by the one or more machine learning model modules 408 to learn the one or more algorithms may include a set of training data associated with each combination of one or more given crops and one or more pests that may affect that given crop, and/or a set training data associated with each combination of one or more given crops and one or more diseases that may affect that given crop. For example, the one or more sets of training data may include a first set of training data associated with the combination of a corn crop and a first pest (or disease) that may affect the corn crop, a second set of training data associated with the combination of a corn crop and a second pest (or disease) that may affect the corn crop, and third set of training data associated with the combination of a soybean crop and a third pest (or disease) that may affect the soybean crop. Each set of training data may include historical data for the farm (e.g., the one or more weather attributes 420, the one or more soil and land characteristics 422, the one or more remote sensing inputs 424, the one or more farm inputs 426, and/or the one or more other inputs 428, such as neighborhood information on pests and/or diseases), as well as data output from the one or more crop phenology model modules 410 and/or data output from the one or more pest (disease)-propagation model modules 412.

In some embodiments, one or more algorithms learned by the one or more machine learning model modules 408 may include a regression model, for each combination of one or more given crops and one or more pests that may affect that given crop, and/or a regression model, for each combination of one or more given crops and one or more diseases that may affect that given crop.

For example, the probability that an epidemic will occur may be represented by $P(E=1)$, wherein $E=1$ for epidemic, $E=0$ for no epidemic. A regression model may be given by:

$$P(E=1)=1/(1+\exp(-z)) \quad \text{(Eq. 1)}$$

wherein z is a function of one or more predictor variables (e.g., "maximum temperature" and "relative humidity", in the example below involving the combination of mango (as the given crop) and powdery mildew caused by *Oidium mangiferae* Berhet (as the pest/disease that may affect the given crop)). An additive error term e may be assumed on the right-hand side of the regression model (Eq. 1). If $P(E=1) \geq 0.5$, then the probability of epidemic may be considered more likely than not; and if $P(E=1)<0.5$, then the probability of epidemic may be considered less than likely. The function z may be given by:

$$z=\beta_0+\beta_1 x_1+\beta_2 x_2+ \ldots +\beta_n x_n \quad \text{(Eq. 2)}$$

wherein $x_1, x_2, \ldots,$ and $x_n$ denote the n predictor variables, and wherein $\beta_0, \beta_1, \beta_2, \ldots,$ and $\beta_n$ denote parameters to be determined. For instance, in the example below involving the combination of mango and powdery mildew, $x_1$ may denote "maximum temperature", $x_2$ may denote "relative humidity", and $\beta_0, \beta_1,$ and $\beta_2$ may denote parameters to be determined. The parameters $\beta_0, \beta_1, \beta_2, \ldots,$ and $\beta_n$ may be determined based on the training data using statistical analysis software. Examples of such statistical analysis software include IBM SPSS® Statistics, KNIME® Analytics Platform, and the like. IBM® and SPSS® are registered trademarks of International Business Machines Corporation ("IBM") in the United States. The acronym "SPSS" refers to the Statistical Product and Service Solutions. Upon substituting function z (Eq. 2) into the regression model (Eq. 1), the regression model becomes:

$$P(E=1)=1/(1+\exp\{-(\beta_0+\beta_1 x_1+\beta_2 x_2+\ldots+\beta_n x_n)\}) \quad \text{(Eq. 3)}$$

Once parameters $\beta_0, \beta_1, \beta_2, \ldots,$ and $\beta_n$ in the regression model (Eq. 3) are determined, the one or more machine learning model modules 408 may apply the regression model (Eq. 3) to data that the one or more machine learning model modules 408 has/have not seen before (e.g., data from a testing instance outside the training data), and make predictions about those data.

As noted above, for the combination of mango (as the given crop) and powdery mildew caused by *Oidium mangiferae* Berhet (as the pest/disease that may affect the given crop), the one or more algorithms learned by the one or more machine learning model modules 408 may include variables such as maximum temperature and relative humidity. These variables (i.e., maximum temperature and relative humidity) may be among and/or based on the one or more weather attributes 420. In some embodiments, these variables may be obtained by periodically (e.g., hourly, quarter hourly, etc.) sensing over one or more periods, at sub-farm scale, the temperature and relative humidity in the farm, from which may then be determined the average maximum temperature and the average relative humidity during the one or more periods. The average maximum temperature for each of the one or more periods may be determined by, for example, sensing the temperature hourly and averaging each day's maximum temperature over that period. The average relative humidity for each of the one or more periods may be determined by, for example, sensing relative humidity hourly and averaging the relative humidity over that period. The one or more periods may be based on the repeated life-cycles of powdery mildew. For example, given the start of possible occurrence of epidemic typically takes place at the same time each year and given the repeated life-cycles of powdery mildew are approximately four to seven days, four such periods (i.e., a 7-day period, a 6-day period, a 5-day period, and a 4-day period) immediately preceding the start of possible occurrence of epidemic for each of a plurality of years may be used as training data, along with powdery mildew status observed following the start of possible occurrence of epidemic for each of the plurality of years.

In addition to, or in lieu of, the above weather variables (i.e., the maximum temperature and the relative humidity), the one or more algorithms learned by the one or more machine learning model modules 408 may include one or more other weather variables (e.g., minimum temperature, wind velocity, wind direction, etc.) among and/or based on the one or more weather attributes 420, one or more variables among and/or based on the one or more soil and land characteristics 422, one or more variables among and/or based on the one or more remote sensing inputs 424, one or more variables among and/or based on the one or more farm inputs 426, one or more variables among and/or based on the one or more other inputs 428 (e.g., neighborhood information on pests and/or diseases), one or more variables among and/or based on data output from the one or more crop phenology model modules 410, and/or one or more variables among and/or based on data output from the one or more pest (disease)-propagation model modules 412.

In a different example involving mango as the given crop, for the combination of mango and the fruit fly, the one or more algorithms learned by the one or more machine learning model modules 408 may include variables such as maximum temperature, minimum temperature, and relative humidity (morning). These variables (i.e., maximum temperature, minimum temperature, and relative humidity (morning)) may be among and/or based on the one or more weather attributes 420. In some embodiments, these variables may be obtained by periodically (e.g., hourly, quarter hourly, etc.) sensing over one or more periods, at sub-farm scale, the temperature and relative humidity in the farm, from which may then be determined the average maximum temperature, the average minimum temperature, and the average relative humidity (morning) during the one or more periods. The average maximum temperature for each of the one or more periods may be determined by, for example, sensing the temperature hourly and averaging each day's maximum temperature over that period. The average minimum temperature for each of the one or more periods may be determined by, for example, sensing the temperature hourly and averaging each day's minimum temperature over that period. The average relative humidity (morning) for each of the one or more periods may be determined by, for example, sensing relative humidity hourly and averaging each morning's relative humidity over that period.

In addition to, or in lieu of, the above weather variables (i.e., i.e., maximum temperature, minimum temperature, and relative humidity (morning)), the one or more algorithms learned by the one or more machine learning model modules 408 may include one or more other weather variables (e.g., wind velocity, wind direction, etc.) among and/or based on the one or more weather attributes 420, one or more variables among and/or based on the one or more soil and land characteristics 422, one or more variables among and/or based on the one or more remote sensing inputs 424, one or more variables among and/or based on the one or more farm inputs 426, one or more variables among and/or based on the one or more other inputs 428 (e.g., neighborhood information on pests and/or diseases), one or more variables among and/or based on data output from the one or more crop phenology model modules 410, and/or one or more variables among and/or based on data output from the one or more pest (disease)-propagation model modules 412.

In another example, for the combination of mandarin orange and citrus gummosis disease caused by *Phytophthora citrophthora*, the one or more algorithms learned by the one or more machine learning model modules 408 may include variables such as temperature, rainfall, leaf area index, and leaf chlorophyll content. Some of these variables (i.e., temperature and rainfall) may be among and/or based on the one or more weather attributes 420. In some embodiments, these variables (i.e., temperature and rainfall) may be obtained by periodically (e.g., hourly, quarter hourly, etc.) sensing over one or more periods, at sub-farm scale, the temperature and rainfall in the farm, from which may then be determined the average temperature and cumulative rainfall during the one or more periods. The average temperature for each of the one or more periods may be determined by, for example, sensing the temperature hourly and averaging each day's temperature over that period. The cumulative rainfall for each of the one or more periods may be determined by, for example, sensing the total rainfall each day and summing each day's rainfall over that period. Others of these variables (i.e., leaf area index and leaf chlorophyll content) may be among and/or based on the one or more remote sensing inputs 424. For example, one or more of these other variables (i.e., leaf area index and leaf chlorophyll content) may be obtained by periodically (e.g., hourly) capturing over one or more periods, at sub-farm scale, image data of the farm, from which may then be determined the leaf area index and the leaf chlorophyll content during the one or more periods. In some embodiments, a conventional model, such as a leaf-based inverse PROSAIL (PROSPECT+SAIL) model, may be used to extract the leaf area index and the leaf chlorophyll content. Alternatively, one or more of these other variables (i.e., leaf area index and leaf chlorophyll content) may be among and/or based on data output from the one or more crop phenology model modules 410. For example, one or more of these other variables (i.e., leaf area index and leaf chlorophyll content) may be obtained by using the one or more crop phenology model modules 410 to periodically (e.g., hourly) simulate over one or more periods, at sub-farm scale, the leaf area index and the leaf chlorophyll content during the one or more periods.

In addition to, or in lieu of, the above variables (i.e., temperature, rainfall, leaf area index, and leaf chlorophyll content), the one or more algorithms learned by the one or more machine learning model modules 408 may include one or more other variables among and/or based on the one or more weather attributes 420, the one or more soil and land characteristics 422, the one or more the remote sensing inputs 424, the one or more farm inputs 426, the one or more other inputs 428 (e.g., neighborhood information on pests and/or diseases), data output from the one or more crop phenology model modules 410, and/or data output from the one or more pest (disease)—propagation model modules 412.

In yet another example, for the combination of mustard and Alternaria blight, the one or more algorithms learned by the one or more machine learning model modules 408 may include variables such as minimum temperature, relative humidity (morning), and relative humidity (evening). These variables (i.e., minimum temperature, relative humidity (morning), and relative humidity (evening)) may be among and/or based on the one or more weather attributes 420. In some embodiments, these variables may be obtained by periodically (e.g., hourly, quarter hourly, etc.) sensing over one or more periods, at sub-farm scale, the temperature and relative humidity in the farm, from which may then be determined the average minimum temperature, the average relative humidity (morning), and the average relative humidity (evening) during the one or more periods.

In addition to, or in lieu of, the above variables (i.e., minimum temperature, relative humidity (morning), and relative humidity (evening)), the one or more algorithms learned by the one or more machine learning model modules 408 may include one or more other variables among and/or based on the one or more weather attributes 420, the one or more soil and land characteristics 422, the one or more the remote sensing inputs 424, the one or more farm inputs 426, the one or more other inputs 428 (e.g., neighborhood information on pests and/or diseases), data output from the one or more crop phenology model modules 410, and/or data output from the one or more pest (disease)-propagation model modules 412.

In a different example involving mustard as the given crop, for the combination of mustard and White rust, the one or more algorithms learned by the one or more machine learning model modules 408 may include variables such as maximum temperature, minimum temperature, and relative humidity (morning). These variables (i.e., maximum temperature, minimum temperature, and relative humidity (morning)) may be among and/or based on the one or more weather attributes 420. In some embodiments, these variables may be obtained by periodically (e.g., hourly, quarter hourly, etc.) sensing over one or more periods, at sub-farm scale, the temperature and relative humidity in the farm, from which may then be determined the average maximum temperature, the average minimum temperature, and the average relative humidity (morning) during the one or more periods.

In addition to, or in lieu of, the above variables (i.e., maximum temperature, minimum temperature, and relative humidity (morning)), the one or more algorithms learned by the one or more machine learning model modules 408 may include one or more other variables among and/or based on the one or more weather attributes 420, the one or more soil and land characteristics 422, the one or more the remote sensing inputs 424, the one or more farm inputs 426, the one or more other inputs 428 (e.g., neighborhood information on pests and/or diseases), data output from the one or more crop phenology model modules 410, and/or data output from the one or more pest (disease)-propagation model modules 412.

In still yet another example, for the combination of cotton and the White fly, the one or more algorithms learned by the one or more machine learning model modules 408 may include variables such as maximum temperature, minimum temperature, relative humidity (morning), and relative humidity (evening). These variables (i.e., maximum temperature, minimum temperature, relative humidity (morning), and relative humidity (evening)) may be among and/or based on the one or more weather attributes 420. In some embodiments, these variables may be obtained by periodically (e.g., hourly, quarter hourly, etc.) sensing over one or more periods, at sub-farm scale, the temperature and relative humidity in the farm, from which may then be determined the average maximum temperature, the average minimum temperature, the average relative humidity (morning), and the average relative humidity (evening) during the one or more periods.

In addition to, or in lieu of, the above variables (i.e., maximum temperature, minimum temperature, relative humidity (morning), and relative humidity (evening)), the one or more algorithms learned by the one or more machine learning model modules 408 may include one or more other variables among and/or based on the one or more weather attributes 420, the one or more soil and land characteristics 422, the one or more the remote sensing inputs 424, the one or more farm inputs 426, the one or more other inputs 428 (e.g., neighborhood information on pests and/or diseases), data output from the one or more crop phenology model modules 410, and/or data output from the one or more pest (disease)—propagation model modules 412.

In yet still another example, for the combination of sugarcane and *Pyrilla*, the one or more algorithms learned by the one or more machine learning model modules 408 may include variables such as maximum temperature and mean relative humidity. These variables (i.e., maximum temperature and mean relative humidity) may be among and/or based on the one or more weather attributes 420. In some embodiments, these variables may be obtained by periodically (e.g., hourly, quarter hourly, etc.) sensing over one or more periods, at sub-farm scale, the temperature and relative humidity in the farm, from which may then be determined the average maximum temperature and the average mean relative humidity during the one or more periods.

In addition to, or in lieu of, the above variables (i.e., maximum temperature and mean relative humidity), the one or more algorithms learned by the one or more machine learning model modules 408 may include one or more other variables among and/or based on the one or more weather attributes 420, the one or more soil and land characteristics 422, the one or more remote sensing inputs 424, the one or more farm inputs 426, the one or more other inputs 428 (e.g., neighborhood information on pests and/or diseases), data output from the one or more crop phenology model modules 410, and/or data output from the one or more pest (disease)-propagation model modules 412.

The one or more crop phenology model modules 410 may determine, for each crop type, a simulated crop growth time series for the farm (e.g., at farm scale) based on historical, current, and/or forecast data for the farm (e.g., the one or more weather attributes 420, the one or more soil and land characteristics 422, the one or more remote sensing inputs 424, the one or more farm inputs 426, and/or the one or more other inputs 428, such as neighborhood information on pests and/or diseases) received over the one or more networks 406. The one or more crop phenology model modules 410 may, for example, estimate the growing time from sowing to seed maturity, as well as the timing of different growth stages, such as the beginning grain fill stage.

For example, with respect to maize, the growth stages simulated by the one or more crop phenology models 410 may include germination, emergence, end of juvenile, floral induction, 75% silking, beginning grain fill, maturity, and harvest. In another example, with respect to wheat, the growth stages simulated by the one or more crop phenology models 410 may include germination, emergence, terminal spikelet, end ear growth, beginning grain fill, maturity, and harvest. In yet another example, with respect to barley, the growth stages simulated by the one or more crop phenology models 410 may include germination, emergence, maximum primordia, end ear growth, beginning grain fill, maturity, and harvest.

The one or more crop phenology model modules 410 may include one or more phenology model modules in conventional crop growth simulation models. Common crop growth simulation models include, but are not limited to, Crop Estimation through Resource and Environment Synthesis (CERES), Decision Support System for Agrotechnology Transfer (DSSAT), and InfoCrop. The amount of input data required by crop growth simulation models varies from model to model, but crop growth simulation models often require information regarding the site, soil, initial conditions, weather, and crop management. Crop growth simulation models typically utilize accumulated weather conditions that have occurred from crop planting to the current date to provide a historical profile of crop development. Examples of conventional crop growth simulation models that include phenology model modules suitable for inclusion, in whole or in part, within the crop phenology model modules 410 include, but are not limited to, the phenology model modules in DSSAT (e.g., DSSAT-cropping system model (DSSAT-CSM)), CERES (e.g., CERES-Wheat, CERES-Maize, CERES-Sorghum, CERES-Rice, etc.), CROPGRO, SOYGRO, and the like.

In some embodiments, a simulated crop growth time series for the farm determined for each crop type by the one or more crop phenology models 410 and provided to the one or more machine learning modules 408 may include plant growth module outputs of one or more conventional crop growth simulation models. For example, such plant growth module outputs (e.g., from a CROPGRO Plant Template module and/or individual plant growth modules, such as CERES-Maize, CERES-Wheat, CERES-Sorghum, CERES-Rice, etc.) may include, but are not limited to, NSTRES {nitrogen stress factor, wherein 1=no stress, 0=maximum stress}, RLV(L) {root length density for soil layer L (cm [root]/cm$^3$[soil])}, SENCLN(I, J) {daily senesced plant matter, wherein I=0 for surface, 1 for soil: J=1 for C, 2 for lignin, 3 for N (g[C, N, or lignin]/(m$^2$ d))}, STGDOY(I) {day when plant stage I occurred}, UNH4(L) {rate of root uptake of NH$_4$ (kg[N]/ha d))}, UNO3(L) {rate of root uptake of NO$_3$ (kg[N]/(ha d))}, XHLAI {healthy leaf area index (LAI) (m$^2$[leaf]/m$^2$[ground])}, XLAI {leaf area index (LAI) (m2[leaf]/m2[ground])}, YREMGR {day of emergence}, and YRNR8 {harvest maturity date}.

The one or more pest (disease)-propagation model modules 412 may determine, for each combination of crop type and pest (disease) that may affect that crop type, a simulated crop pest-propagation series and/or a simulated crop disease-propagation time series for the farm (e.g., at farm scale) based on historical, current, and/or forecast data for the farm (e.g., the one or more weather attributes 420, the one or more soil and land characteristics 422, the one or more remote sensing inputs 424, the one or more farm inputs 426, and/or the one or more other inputs 428, such as neighborhood information on pests and/or diseases) received over the one or more networks 406. The one or more pest (disease)-propagation model modules 412 may include one or more conventional pest (disease)-propagation modeling systems. Examples of conventional pest (disease)-propagation modeling systems suitable for inclusion, in whole or in part, within the one or more pest (disease)-propagation model modules 412 include, but are not limited to, CLIMEX, DYMEX, NAPPFAST, and the like.

The CLIMEX modeling system predicts the effect of climate on species, including the distribution of insects, plants, pathogens, and vertebrates. CLIMEX uses simulation and modeling techniques to mimic biological mechanisms that limit species' geographical distribution and determine those species' seasonal phenology and relative abundance.

The DYMEX modeling system is a modular modelling package that allows a user to develop and run deterministic population models of biological organisms rapidly. The population models are structured around species' lifecycles based on growth stages that individuals of those species' pass through during their lifetime.

The CLIMEX and DYMEX modeling systems are commercially available.

NAPPFAST (NCSU-APHIS Plant Pest Forecast) is a web-based modeling system that links georeferenced climatological weather data (e.g., daily climate and historical weather data) with biological models for plant pest modelling. The acronym "NCSU" refers to North Carolina State University. The acronym "APHIS" refers to the U.S. Department of Agriculture's Animal and Plant Health Inspection Service (USDA-APHIS). The NAPPFAST modelling system contains interactive templates, including: an infection template for plant pathogens; a generic template with pre-programmed equations for creating empirical models; and a degree-day template. For example, the degree-day template may be used to model phenological development of insect pests, as well as other organisms (e.g., weeds, other arthropods such as spiders, etc.) or crops based on degree days. The degree-day template allows selection of the number of phenological stages and the number of generations. For example, with regard to a given insect pest, the degree-day template requires the following pest developmental parameters as input data: the degree day requirements for the pest (e.g., the degree day requirements for each phenological stage of the pest); and the developmental temperature threshold for the pest (i.e., the developmental temperature base and upper threshold for the pest).

Pest developmental parameters used as input data for the NAPPFAST modeling system and other conventional pest (disease)-propagation modeling systems can usually be found in the scientific literature, at least for key pest species. Also, the Centre for Agriculture and Bioscience International (CABI) Crop Protection Compendium (CPC) summarizes insect development at its website<https://www.cabi.org/cpc/>. In addition, the University of California (UC) Statewide Integrated Pest Management (IPM) Program lists development data for insects at its website<http://ipm.ucanr.edu/MODELS/>. Also, an Insect Development Database (IDD) containing developmental requirements for over 500 insect pests and parasitoids developed to support insect phenology models such as the NAPPFAST modeling system is available at <http://ring.ciard.net/nappfast-pest-database-thresholds-and-growing-degree-days>. The developmental requirements data in the IDD includes, where available, the base threshold of development (° C.), the upper developmental threshold (° C.), and the developmental requirements (degree-day (DD)) for insect life stages (egg, larvae, pupae, adult). Such input data for the NAPPFAST modeling system and other conventional pest (disease)-propagation modeling systems may be among and/or based on the other inputs 428 illustrated in FIG. 4.

Additional parameters that may be used as input data in the NAPPFAST modeling system and other conventional pest (disease)-propagation modeling systems include, but are not limited to, daily climate and historical weather data. For example, such additional parameters may include daily mean temperature (° C.), daily minimum temperature (° C.), daily maximum temperature (° C.), daily temperature range (° C.), frost day frequency (per month), wet day frequency (days per month), total hours of leaf wetness per day (h, a derived variable), average daily relative humidity (%), average daily wind speed (k/h), precipitation (mm), average soil temperature at 5 cm depth (° C.), vapor pressure (hectopascal), cloud cover (%), and evaporation (mm, a derived variable). Such input data for the NAPPFAST modeling system and other conventional pest (disease)-propagation modeling systems may be among and/or based on the one or more weather attributes 420, the one or more soil & land characteristics 422, and the one or more remote sensing inputs 424 illustrated in FIG. 4.

Following creation of a pest (disease)-propagation model by the NAPPFAST modeling system and/or other conventional pest (disease)-propagation modeling systems, a numerical output may be exported in the form of graphs, maps, and/or raw data. For example, the NAPPFAST modeling system can create raster or grid-based maps using a Barnes interpolation at a 10 km² resolution. Barnes interpolation (named after Stanley L. Barnes) is the interpolation of unstructured data points from a set of measurements of an unknown function in two dimensions into an analytic function of two variables. Using Barnes analysis, a grid may be produced from a weighted average of irregularly spaced observations. Maps created in the NAPPFAST modeling system may be exported as Geo-TIFF images, for example, and then imported directly into the one or more machine learning model modules 408 (or, indirectly, through Geographic Information Systems (GIS) software) for further analysis. Although the NAPPFAST modeling system's spatial resolution (10 km²) and temporal resolution (days/months) are relatively course, the numerical output model output of the NAPPFAST modeling system can provide the machine learning module(s) 408 with a first-guess estimate of a pest's establishment potential.

In some embodiments, in lieu of, or in addition to, the one or more machine learning modules 408 receiving a simulated crop pest-propagation time series and/or a simulated crop disease-propagation time series for the farm from the one or more pest (disease)-propagation model modules 412 (e.g., a numerical output exported by the NAPPFAST modeling system and/or other conventional pest (disease)-propagation modeling system), the regression learner 402 and/or the one or more machine learning modules 408 may receive a course resolution P&D risk profile (e.g., at farm scale) for the farm from IBM Watson Decision Platform for Agriculture or other similar systems. For example, such a course resolution P&D risk profile for the farm may be among and/or based on the other inputs 428 illustrated in FIG. 4.

In some embodiments, the regression learner 402 and/or the one or more machine learning modules 408 may receive neighborhood information on pests and/or diseases. The neighborhood information on pests and/or diseases may include a course resolution P&D risk profile (e.g., at farm scale) information for one or more neighboring farms (i.e., one or more farms neighboring the farm) from IBM Watson Decision Platform for Agriculture or other similar systems. For example, such a course resolution P&D risk profile for the one or more neighboring farms may be among and/or based on the other inputs 428 illustrated in FIG. 4. In some embodiments, the neighborhood information on pests and/or diseases may be refined based on one or more neighborhood learning inputs 430 (i.e., a feedback loop from the regression learner 402). For example, the one or more neighborhood learning inputs 430 may be utilized by IBM Watson Decision Platform for Agriculture or other similar systems to calculate a recurrence relation.

Figure 5:
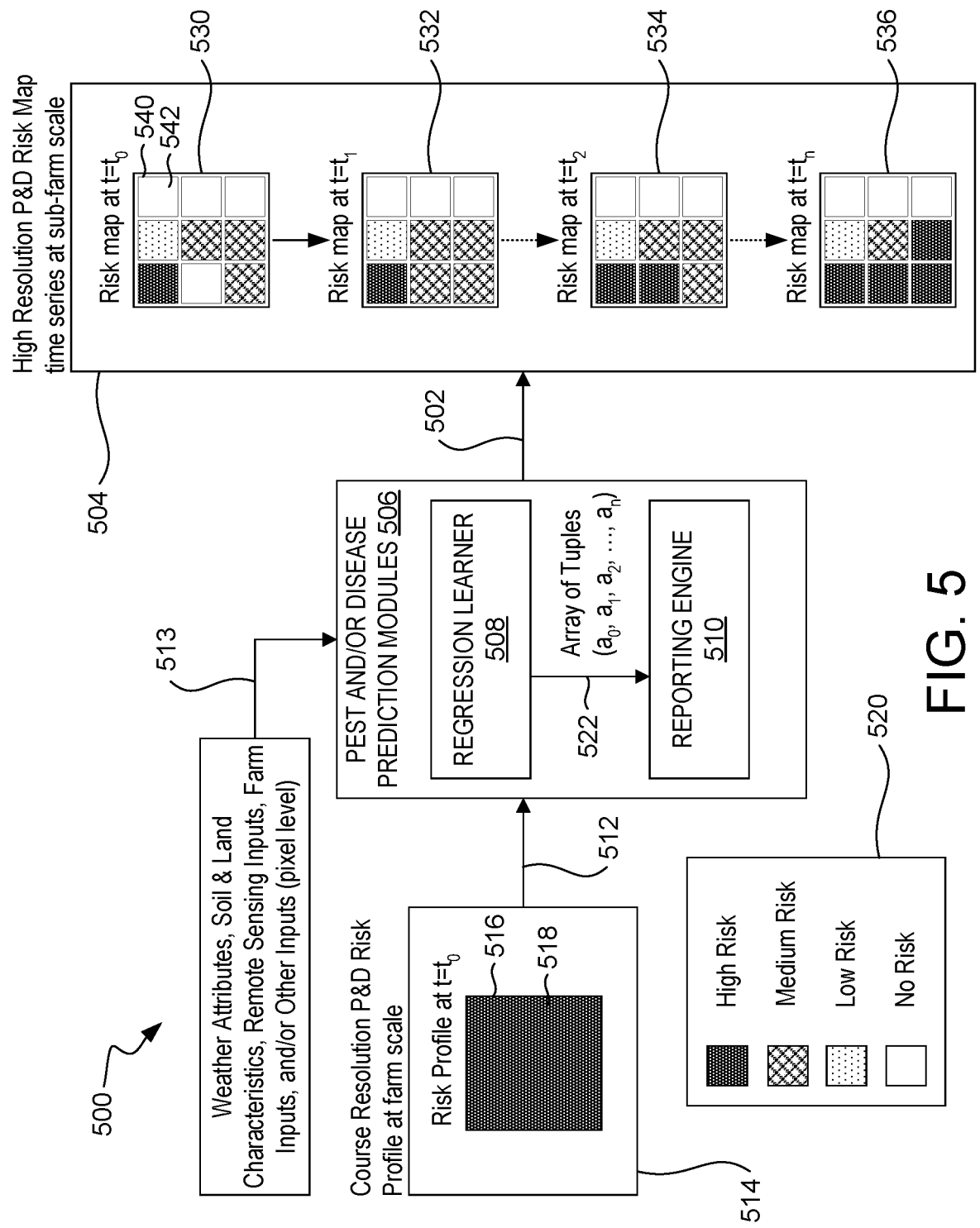
FIG. 5 depicts an exemplary system for estimation of crop pest risk and/or crop disease risk at sub-farm level, an output (e.g., pixel level) of which includes a high resolution risk map time series, according to one or more embodiments.

Referring now to FIG. 5, an exemplary system 500 for estimation of crop pest risk and/or crop disease risk at sub-farm level is depicted, an output 502 (e.g., pixel level) of which includes data that may be displayed (e.g., on the display 1142 in FIG. 11 and/or the integrated display/touch screen 1204 in FIG. 12) as a high resolution P&D risk map time series 504 (at sub-farm scale), in accordance with one or more embodiments. The exemplary system 500 depicted in FIG. 5 includes pest and/or disease prediction modules 506, including a regression learner 508 and a reporting engine 510. The regression learner 508 in FIG. 5 may correspond to the regression learner 402 shown in FIG. 4. In some embodiments, the regression learner 508 determines, for each of a plurality of pixel sets of a farm region, crop risk data. In some embodiments, the reporting engine 510 may categorize the farm region into a plurality of sub-farms each defining a risk level category for that sub-farm (e.g., high risk, medium risk, low risk, or no risk) based on the crop risk data determined by the regression learner 508.

In the embodiment illustrated in FIG. 5, the regression learner 508 may receive a course resolution input 512, including a course resolution P&D risk profile 514 (at farm scale) for the farm. For example, the regression learner 508 may receive the course resolution P&D risk profile 514 from IBM Watson Decision Platform for Agriculture or other similar systems. In some embodiments, the course resolution P&D risk profile 514 may be among and/or based on the other inputs 428 illustrated in FIG. 4.

In the example illustrated in FIG. 5, the course resolution P&D risk profile 514 includes a risk profile at time=$t_0$ that may be displayed as a shape element 516 containing a fill pattern 518. The shape element 516 may represent the farm. The fill pattern 518 of the shape element 516 may reflect an estimation of crop pest risk and/or crop disease risk (at farm scale) within the farm at time=$t_0$. In the example illustrated in FIG. 5, the shape element 516 is a square for purposes of illustration, not limitation. The shape element 516 may take any shape. The fill pattern 518 of the shape element 516 is homogeneous throughout the shape element 516 because the course resolution P&D risk profile 514 is at farm scale. In the example illustrated in FIG. 5, the fill pattern 518 of the shape element 516 indicates the farm (as a whole) is estimated as "High Risk", which is one of four possible risk levels (i.e., "High Risk", "Medium Risk", "Low Risk", and "No Risk") set forth in a risk key 520. More generally, however, the fill pattern 518 of the shape element 516 may correspond to one of any number of risk levels. In some embodiments, the course resolution P&D risk profile 514 may be in the form of a time series (i.e., an estimation of crop pest risk and/or crop disease risk (at farm scale) within the farm at times=$t_0, t_1, t_2, \ldots t_n$).

In the example illustrated in FIG. 5, the regression learner 508 may receive the course resolution input 512, including the course resolution P&D risk profile 514 (at farm scale), along with one or more pixel level inputs 513, and may apply one or more regression models to data among or based upon the one or more pixel level inputs 513 and, optionally, the course resolution input 512. For example, the regression learner 508 may apply an algorithm, which was previously learned by the regression learner 508 using training data, to data among or based upon the one or more pixel level inputs 513 and, optionally, the course resolution input 512. The pixel level inputs 513 (and, optionally, the course resolution input 512) may include one or more predictor variables utilized by the learned algorithm. In some embodiments, the one or more pixel level inputs 513 received by the regression learner 508 may include one or more weather attributes (e.g., 420 in FIG. 4), one or more soil and land characteristics (e.g., 422 in FIG. 4), one or more remote sensing inputs (424 in FIG. 4), one or more farm inputs (426 in FIG. 4), and/or one or more other inputs (e.g., 428 in FIG. 4), such as neighborhood information on pests and/or diseases.

In some embodiments, the course resolution P&D risk profile 514 (at farm scale) may be utilized by the regression learner 508 as a predictor variable of the one or more regression models. In some embodiments, the course resolution P&D risk profile 514 (at farm scale) may be utilized by the regression learner 508 to provide a threshold determination of whether a particular crop pest and/or a particular crop disease warrants further (i.e., more granular) analysis. In some embodiments, the course resolution P&D risk profile 514 (at farm scale) may be omitted.

The regression learner 508 may output (e.g., in a manner analogous to that described above with respect to the regression learner 402 shown in FIG. 4) a time series of arrays (e.g., $a_0, a_1, a_2, \ldots, a_n$) each of which may be an array $a_i$ of tuples<Time Stamp, Risk Value> predicted at time $t_i$. For example, an output 522 of the regression learner 508 may include an array $a_0$ of tuples<Time Stamp=$t_0$, Risk Value$_{t0}$> predicted at time $t_0$, an array $a_1$ of tuples<Time Stamp=$t_1$, Risk Value$_{t1}$> predicted at time $t_1$, an array $a_2$ of tuples<Time Stamp=$t_2$, Risk Value$_{t2}$> predicted at time $t_2, \ldots$, and an array $a_n$ of tuples<Time Stamp=$t_n$, Risk Value$_{tn}$> predicted at time $t_n$. Each tuple corresponds with a "pixel set" (at least one pixel) of the farm.

For example, the array $a_0$ of tuples<Time Stamp=$t_0$, Risk Value$_{t0}$> predicted at time $t_0$ (i.e., an initial array of the time series output 522 of the regression learner 508, which may be provided as input to the reporting engine 510) may represent an estimate of crop pest risk and/or crop disease risk at the same point in time (time=$t_0$) as the course resolution P&D risk profile 514. The regression learner 508 may output this array (i.e., $a_0$) of tuples by applying one or more regression models to historical and/or current data among or based upon the one or more pixel level inputs 513 and, optionally, the course resolution input 512.

Also, the array $a_1$ of tuples<Time Stamp=$t_1$, Risk Value$_{t1}$> predicted at time $t_1$, the array $a_2$ of tuples<Time Stamp=$t_2$, Risk Value$_{t2}$> predicted at time $t_2, \ldots$, and the array $a_n$ of tuples<Time Stamp=$t_n$, Risk Value$_{tn}$> predicted at time $t_n$ (i.e., follow-on arrays of the time series output 522 of the regression learner 508, which may be provided as input to the reporting engine 510) may represent an estimate of crop pest risk and/or crop disease risk at successive points in time (time=$t_1, t_2, \ldots$, and $t_n$) subsequent to the course resolution P&D risk profile 514 (time=$t_0$). The regression learner 508 may output these arrays (i.e., $a_1, a_2, \ldots$, and $a_n$) of tuples by applying one or more regression models to forecast data (in lieu of, or in addition to, historical and/or current data) among or based upon the one or more pixel level inputs 513 and, optionally, the course resolution input 512.

In the example illustrated in FIG. 5, the reporting engine 510 may provide the output 502, which includes data that may be displayed (e.g., on the display 1142 in FIG. 11 and/or the integrated display/touch screen 1204 in FIG. 12) as the high resolution P&D risk map time series 504 (at sub-farm scale), based on the output of the regression learner 508. For example, the high resolution P&D risk map time series 504 provided by the reporting engine 510 may be based on the time series of arrays output of the regression learner 508. In the example illustrated in FIG. 5, the high resolution P&D risk map time series 504 may include a risk map at time=$t_0$ 530, a risk map at time=$t_1$ 532, a risk map at time=$t_2$ 534, . . . , and a risk map at time=$t_n$ 536 respectively based on the array $a_0$ of tuples<Time Stamp=$t_0$, Risk Value$_{t0}$>predicted at time $t_0$, the array $a_1$ of tuples<Time Stamp=$t_1$, Risk Value$_{t1}$>predicted at time $t_1$, the array $a_2$ of tuples<Time Stamp=$t_2$, Risk Value$_{t2}$>predicted at time $t_2, \ldots$, and the array $a_n$ of tuples<Time Stamp=$t_n$, Risk Value$_{tn}$> predicted at time $t_n$ output of the regression learner 508. Each of the risk maps 530, 532, 534, and 536 may be displayed (e.g., on the display 1142 in FIG. 11 and/or the integrated display/touch screen 1204 in FIG. 12) in the form of a visual heat-map.

In the example illustrated in FIG. 5, each of the risk maps 530, 532, 534, and 536 is comprised of a 3×3 matrix of nine "pixel sets" (at least one pixel) each of which may be displayed (e.g., on the display 1142 in FIG. 11 and/or the integrated display/touch screen 1204 in FIG. 12) as a shape element 540 containing a fill pattern 542. In the example illustrated in FIG. 5, each risk map 530, 532, 534, and 536 is configured as a 3×3 matrix for purposes of illustration, not limitation. Each risk map may include any number of pixel sets, in any configuration. Each of the risk maps 530, 532, 534, and 536 may be representative of the farm at a different time (time=$t_0, t_1, t_2, \ldots, t_n$, respectively). The shape element 540 may represent a pixel set of the farm. The fill pattern 542 of each shape element 540 of each of the risk maps 530, 532, 534, and 536 may reflect an estimation of crop pest risk and/or crop disease risk at the given pixel set of the farm at a different time (time=$t_0, t_1, t_2, \ldots, t_n$, respectively). For example, the fill patterns 542 of the shape elements 540 in the risk map 530 (at time=$t_0$) may be based on the array $a_0$ of tuples<Time Stamp=$t_0$, Risk Value$_{t0}$>predicted at time $t_0$. In the example illustrated in FIG. 5, each shape element 540 is a square for purposes of illustration, not limitation. The shape element 540 may take any shape.

In the example illustrated in FIG. 5, the fill patterns 542 of the shape elements 540 may be any one of four possible risk levels (i.e., "High Risk", "Medium Risk", "Low Risk", and "No Risk") set forth in the risk key 520. More generally, however, the fill patterns 542 of the shape elements 540 may correspond to one of any plural number of possible risk levels. The risk level for a given pixel set within a risk map at time=$t_i$ may be based on the Risk Value$_{ri}$ for that given pixel set within the array $a_i$ of tuples<Time Stamp=$t_i$, Risk Value$_{ri}$> predicted at time $t_i$. For example, assuming Risk Values (e.g., as determined by one or more regression models) are between 0.00 and 1.00, a given pixel set within a risk map may be categorized as having a risk level (i.e., a risk level category) based on Risk Level thresholds, as follows:

"High Risk" when 1.00≥Risk Value>0.70;
"Medium Risk" when 0.70≥Risk Value>0.50;
"Low Risk" when 0.50≥Risk Value>0.20; and
"No Risk" when 0.20≥Risk Value>0.00.

In the example illustrated in FIG. 5, the number of "High Risk" pixel sets in the risk map time series (530→532→534→536) grows over time. For example, in each of the risk maps 530 and 532 (at time=$t_0$ and $t_1$, respectively), there is a single "High Risk" pixel set of the farm. In the risk map 534 (at time=$t_2$), the number of "High Risk" pixel sets of the farm region is projected to increase to two. Finally, in the risk map 536 (at time=$t_n$), the number of "High Risk" pixel sets of the farm region is projected to increase further to four.

In some embodiments, the reporting engine 510 may adjust the possible number of risk levels, as well as the Risk Value thresholds for each risk level, based on a given P&D situation and/or input from the user.

In some embodiments, the reporting engine 510 may provide the output 502 as data that may be displayed as the high resolution P&D risk map time series 504 at various levels of resolution (e.g., a recommended level of resolution determined by the reporting engine 510 and/or a level of resolution as chosen by the user). In some embodiments, the reporting engine 510 may dynamically vary the resolution within the farm region (i.e., the "sub"-level of the "sub-farm"), including providing a recommended level of resolution for a given P&D situation. In some embodiments, the user may choose whether or not to override this recommended resolution level. For example, the reporting engine 510 may generate data that may be displayed (e.g., on the display 1142 in FIG. 11 and/or the integrated display/touch screen 1204 in FIG. 12) as a visual map (e.g., a visual heat-map, such as the visual heat-map 600 in FIG. 6) of different risk level zones, or "sub-farms" of the farm region, wherein the size of the sub-farm is chosen based upon a combination of the recommended resolution level and a user's choice.

Figure 6:
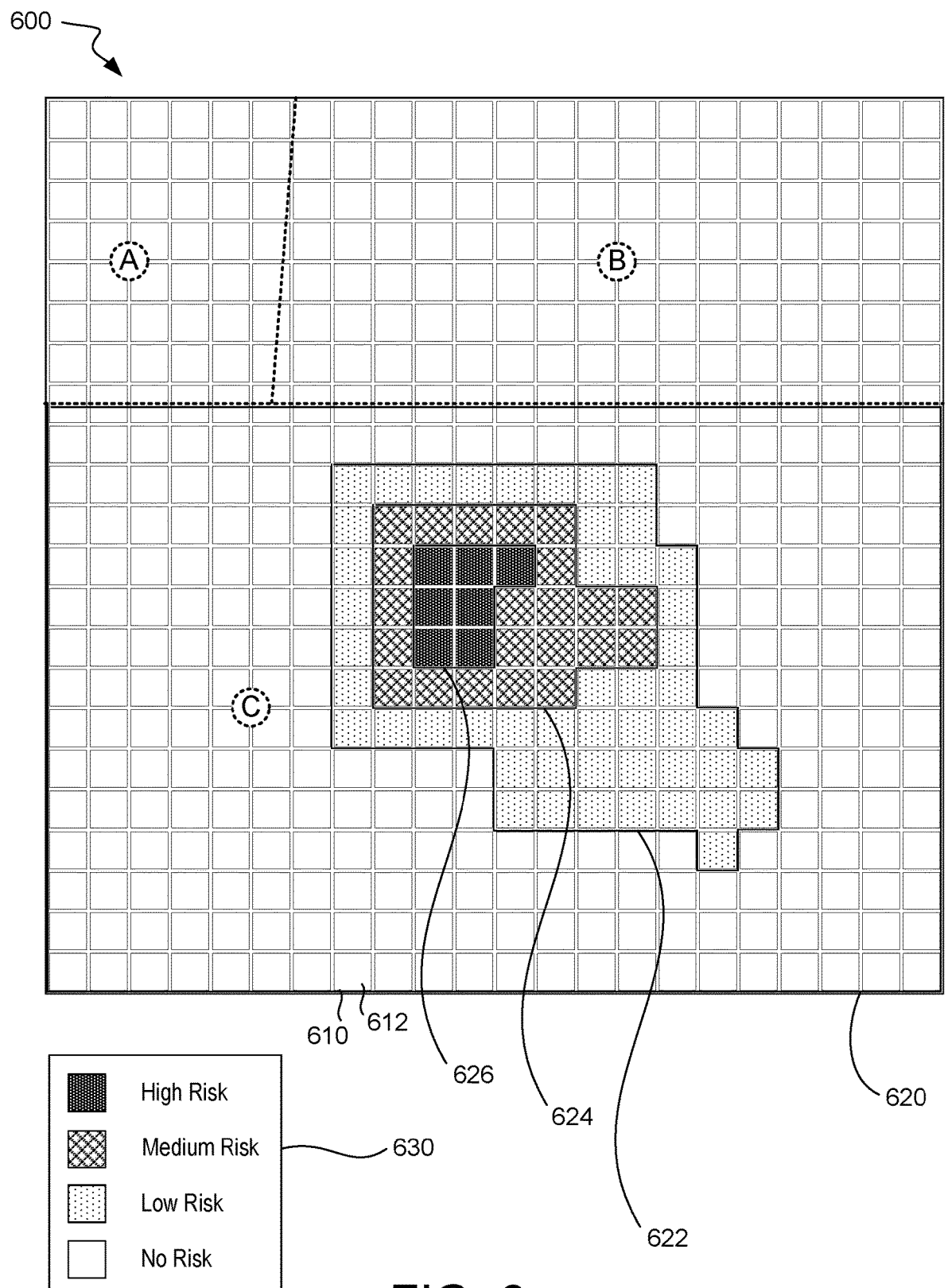
FIG. 6 depicts an exemplary visual heat-map portraying crop pest risk and/or crop disease risk at sub-farm level, according to one or more embodiments.

Referring now to FIG. 6, an exemplary visual heat-map 600 portraying an estimation of crop pest risk and/or crop disease risk at sub-farm level is depicted, in accordance with one or more embodiments. The visual heat-map 600 may represent the entirety of a farm region or a portion thereof. For example, the visual heat-map 600 may portray an estimation of crop pest risk and/or crop disease risk at sub-farm level within a portion of a farm region of particular interest or concern to a grower or other user. In accordance with one or more embodiments, a grower or other user may manipulate an integrated display/touch screen, such as the integrated display/touch screen 1204 in FIG. 12, to "zoom in" on any given portion of a farm region (e.g., the visual heat-map 600 may correspond to that portion of the farm region) from within a visual heat-map portraying crop pest risk and/or crop disease risk at a sub-farm level within the entirety of the farm region. In general, the visual heat-map 600 portrays crop pest risk and/or crop disease risk within a farm region or a portion thereof at a sub-farm level at a particular point in time. In some embodiments, the farm region and/or the portion of the farm region may be determined based on farm definition data received from the grower or other user.

In the example illustrated in FIG. 6, the visual heat-map 600 is comprised of a 22×22 matrix of four hundred eighty-four "pixel sets" (at least one pixel), each of which is displayed (e.g., on the display 1142 in FIG. 11 and/or the integrated display/touch screen 1204 in FIG. 12) as a shape element 610 containing a fill pattern 612. In the example illustrated in FIG. 6, the visual heat-map 600 is configured as a 22×22 matrix for purposes of illustration, not limitation. More generally, the visual heat-map 600 may include any number of pixel sets, in any configuration. In the example illustrated in FIG. 6, each shape element 610 is a square for purposes of illustration, not limitation. The shape element 610 may take any shape.

In the example illustrated in FIG. 6, the farm region is categorized into a plurality of sub-farms (e.g., 620, 622, 624, and 626, described below). For example, based on an estimation of crop pest risk and/or crop disease risk at the given pixel set of the farm region at a particular point in time, a categorization method may drive selection of the fill pattern 612 of each shape element 610. The categorization method may, for example, categorize the sub-farms of the farm region into various risk categories, at any given time. In some embodiments, given a set of scores (e.g., a Risk Value for each of the pixel sets) and risks associated with those scores, a reporting engine (e.g., the reporting engine 510 in FIG. 5) may create a category map that maps each sub-farm region into a category, for the given time. The reporting engine may then generate from the category map one or more color-coded heat maps (e.g., one of which may be the visual heat-map 600) by associating different "heat levels" to different risk levels of the sub-farm areas (e.g., associating "hot" colors to "risky" sub-farms and associating "cool" colors to "less risky" sub-farms), for the given time. In some embodiments, the reporting engine may create a temporal view in which the category and heat level of each sub-farm area changes over time (e.g., sub-farm areas may merge and/or split over time).

In the example illustrated in FIG. 6, the visual heat-map 600 includes zones A, B, and C. Borders separating the zones A, B, and C from each other are denoted as dotted lines in FIG. 6. As used herein, the term "zone" can refer to one or more fields, one or more plots of land, one or more planting regions, one or more management zones, and the like. For instance, the zones A, B, and C may be different planting regions of the farm (e.g., zone A may be a wheat planting region, zone B may be a soybean planting region, and one C may be a corn planting region).

In some embodiments, a reporting engine (e.g., the reporting engine 510 in FIG. 5) may categorize the farm region, one or more portions of the farm region, and/or one or more zones of the farm region into a plurality of sub-farms each defining a risk level category for that sub-farm (e.g., high risk, medium risk, low risk, or no risk) based on crop risk data at pixel set level. In the example illustrated in FIG. 6, zone C is categorized into four sub-farms 620, 622, 624, and 626, each defining a risk level category for that sub-farm, as set forth in a risk key 630. In the example illustrated in FIG. 6, the sub-farms 620, 622, 624, and 624 each define a region categorized as having one of four possible categories of risk level (i.e., "High Risk", "Medium Risk", "Low Risk", and "No Risk"). For example, the sub-farm 620 defines a region categorized as having a risk level of "No Risk". The sub-farm 622 defines a region categorized as having a risk level of "Low Risk". The sub-farm 624 defines a region categorized as having a risk level of "Medium Risk". The sub-farm 626 defines a region categorized as having a risk level of "High Risk". More generally, however, there may be any number of possible risk level categories. Moreover, each risk level category may include one or more sub-farms. The configuration of each of the sub-farms 620, 622, 624, and 626 reflects an estimation of crop pest risk and/or crop disease risk at each of one or more underlying pixel sets of the farm, at a particular point in time.

Figure 7:
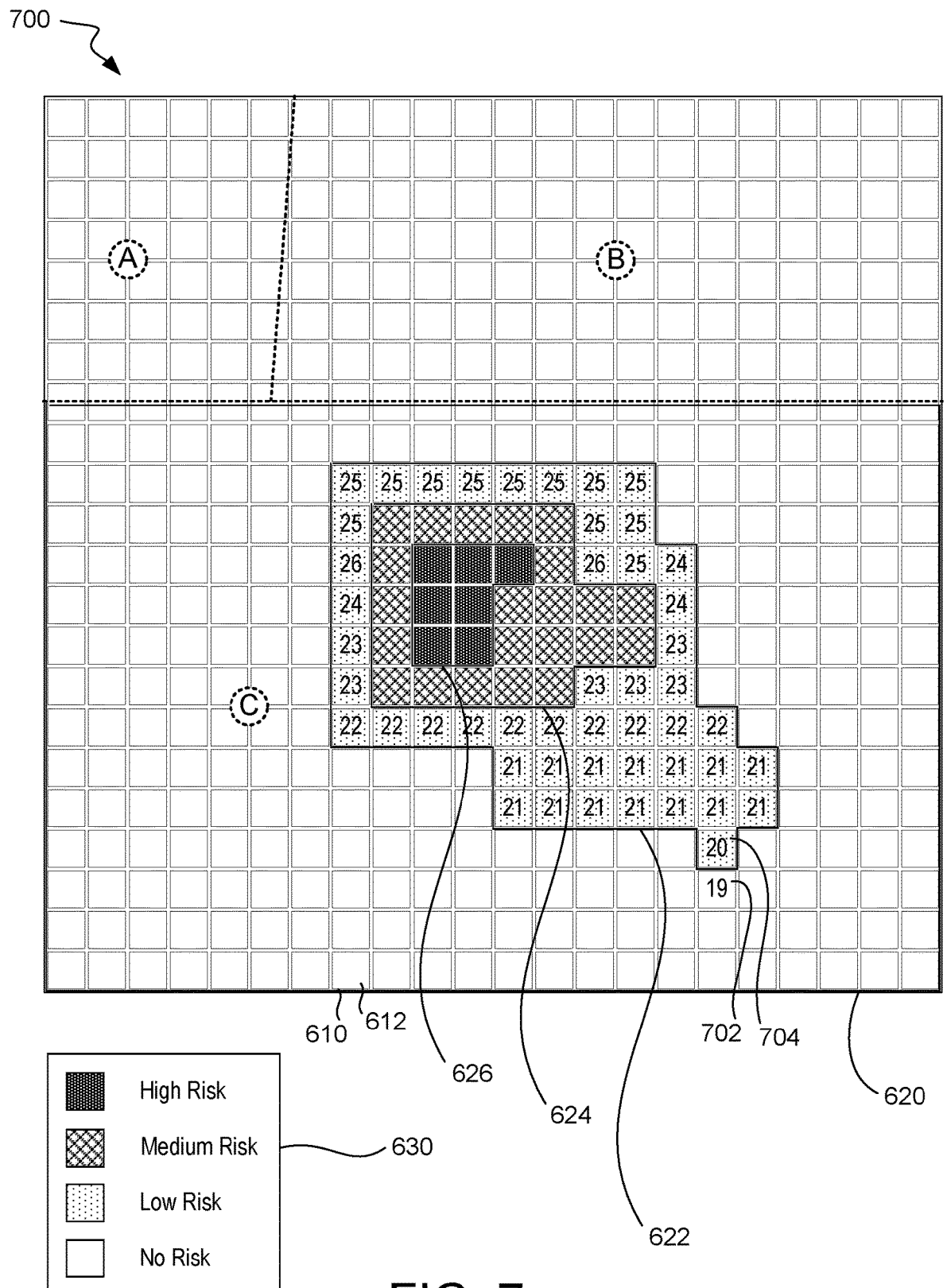
FIG. 7 depicts an exemplary visual heat-map portraying crop pest risk and/or crop disease risk at sub-farm level, in which underlying risk values for certain pixel sets are labelled to illustrate sub-farm expansion, according to one or more embodiments.

Referring now to FIG. 7, an exemplary visual heat-map 700 portraying crop pest risk and/or crop disease risk at sub-farm level is depicted, in which underlying risk values for certain pixel sets are labelled to illustrate sub-farm expansion, in accordance with one or more embodiments. The visual heat-map 700 in FIG. 7 corresponds to the visual heat-map 600 shown in FIG. 6, except the underlying risk values for each of the pixel sets in the "Low Risk" sub-farm 622 and one of the pixel sets (i.e., pixel set 702) in the "No Risk" sub-farm 620 are labelled.

In some embodiments, a reporting engine (e.g., the reporting engine 510 in FIG. 5) may generates an "ideal resolution" by implementing a sub-block extension process that determines whether to combine adjoining pixel sets to form a bigger risk block within the sub-farm. For example, the sub-block extension process may adhere to the following constraints:
- An expansion may occur only by combining a candidate pixel set that is adjacent to at least one known pixel set of the sub-farm that is being extended;
- The difference of the value of the risk factor (e.g., Risk Value) of the candidate pixel set (being considered for inclusion in the extension) and the value of the risk factor (e.g., Risk Value) the neighboring pixel set (already part of the sub-farm that is being considered for expansion) needs to be less than a permitted threshold Th1; and
- The value of the risk factor (e.g., Risk Value) between the candidate pixel set needs to be within a permitted threshold Th2 of all the values of the risk factor (e.g., Risk Value) that are already a part of the neighboring sub-farm (that is evaluating the candidate pixel set for extension of the sub-farm).

The sub-block extension process may also combine two sub-farms. For example, in some embodiments, if two pixel sets are included in the same sub-farm by combination, then the two sub-farms these pixels belong to may also be combined (extended).

In some embodiments, as soon as none of the pixel sets can be further extended, the mapping process is over; the number, size, and location of the sub-farms are already in place—this is the ideal distribution, including the "ideal resolution".

In some embodiments, a grower or other user may vary the resolution by manually applying thresholds (e.g., Th1 and Th2) upon the ideal distribution, thereby combining and/or breaking pixel sets, and generating views of the farm region accordingly.

In some embodiments, the thresholds (e.g., Th1 and Th2) may be adjusted to have different values for different P&D situations (e.g., different combinations of crops and pests/diseases) to generate a recommended level of resolution for a given P&D situation. For example, the reporting engine may adjust the thresholds for a given P&D situation, whereby the "ideal resolution" may become the "recommended resolution" for that particular P&D situation.

In some embodiments, the reporting engine may determine whether to expand a first one of a plurality of sub-farms (e.g., the "Low Risk" sub-farm 622) to include a candidate pixel set (e.g., pixel set 702) of the plurality of pixel sets in a second one of the plurality of sub-farms (e.g., the "No Risk" sub-farm 620) based on whether the candidate pixel set meets at least one sub-farm expansion threshold, wherein the first one of the plurality of sub-farms adjoins the second one of the plurality of sub-farms, and wherein the candidate pixel set is adjacent a neighboring pixel set (e.g., pixel set 704) of the plurality of pixel sets in the first one of the plurality of sub-farms.

In FIG. 7, as noted above, the underlying risk values for certain pixel sets are labelled to illustrate sub-farm expansion. In the example illustrated in FIG. 7, the pixel set 702 in the "No Risk" sub-farm 620 is a candidate pixel set for expansion into the "Low Risk" sub-farm 622. For the candidate pixel set 702, the Risk Value=19. The pixel set 702 in the "No Risk" sub-farm 620 is adjacent a neighboring pixel set 704 in the neighboring "Low Risk" sub-farm 622. For the neighboring pixel set 704, the Risk Value=20. In some embodiments, the reporting engine may implement a sub-block extension process that includes: determining whether a difference between crop risk data (e.g., Risk Value) for the candidate pixel set 702 (Risk Value=19) and the crop risk data (e.g., Risk Value) for the neighboring pixel set 704 (Risk Value=20) is less than a first sub-farm expansion threshold (e.g., Th1); and determining whether a difference between the crop risk data (e.g., Risk Value) for the candidate pixel set 702 (Risk Value=19) and the crop risk data (e.g., Risk Value) for each of the plurality of pixel sets in the "Low Risk" sub-farm 622 (Risk Values=20 to 26) is less than a second sub-farm expansion threshold (e.g., Th2). In this example, as long as the threshold Th1>1 (20-19) and the threshold Th2>7 (26-19) both of these criteria are met and, consequently, the reporting engine may determine to expand the "Low Risk" sub-farm 622 to include the candidate pixel set 702.

In some embodiments, the reporting engine may receive resolution selection data from a grower or other user, wherein the resolution selection data includes at least one of the first and second sub-farm expansion thresholds (e.g., Th1 and Th2).

Figure 8:
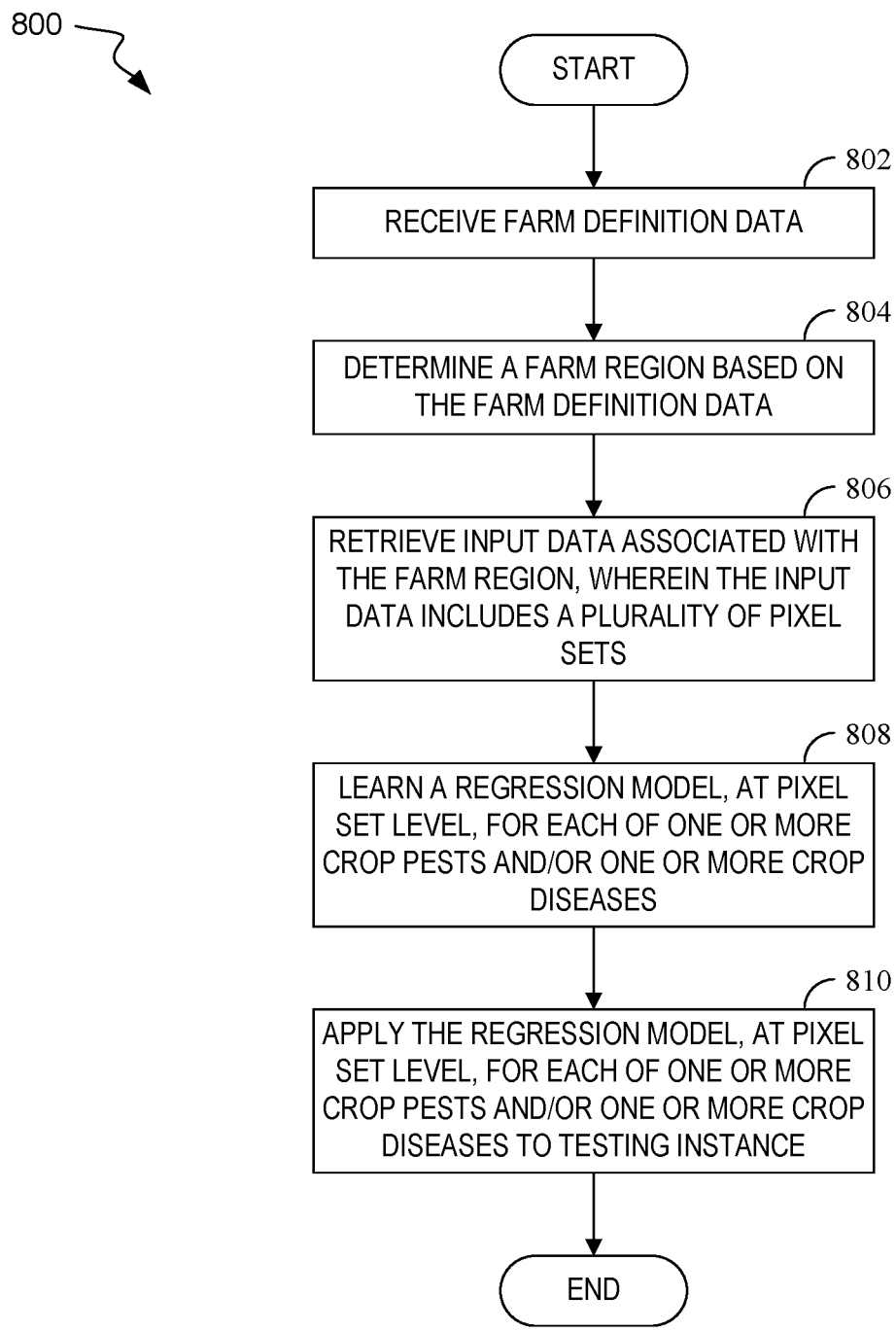
FIG. 8 depicts a flow diagram of an illustrative method of building a regression model at pixel set level for each of one or more crop pests and/or one or more crop diseases, according to one or more embodiments.

Referring now to FIG. 8, a flow diagram 800 of an illustrative method of building a regression model at pixel set level for each of one or more crop pests and/or one or more crop diseases is depicted, in accordance with one or more embodiments. The method 800 sets forth the preferred order of the blocks. It must be understood, however, that the various blocks may occur at any time relative to one another.

The method 800 begins by receiving farm definition data (block 802). For example, at block 802, farm definition data may be received by one or more pest and/or disease prediction modules on a server device. In some embodiments, the farm definition data may be included within a pest and/or disease prediction request sent by a grower using a client device to request estimation of crop pest risk and/or crop disease risk at sub-farm level within the grower's farm. For example, the client device may send the request, which includes farm definition data in the form of GPS-derived geolocation data defining the grower's farm. In some embodiments, the client device may send the request, which includes farm definition data in form of a Common Land Unit (CLU) defining the grower's farm.

The method 800 continues by determining a farm region based on the farm definition data (block 804). For example, at block 804, one or more pest and/or disease prediction modules on a server device may determine a farm region based on the GPS-derived geolocation data and/or the CLU received in block 802.

Next, the method 800 continues by retrieving input data associated with the farm region, wherein the input data includes a plurality of pixel sets (block 806). In some embodiments, at block 806, the method 800 may retrieve input data associated with the farm region (e.g., the farm defined by the farm definition data received in block 802). In some embodiments, at block 806, the method 800 may retrieve input data directly or indirectly associated with the farm region (e.g., an "extended farm" encompassing the farm defined by the farm definition data received in block 802, as well as one or more neighboring farms). In some embodiments, the input data may include a plurality of pixel sets (at least one pixel), with each pixel set defining the smallest possible/permissible resolution of the farm from which data can be meaningfully collected. In some embodiments, the input data retrieved in block 806 may be preprocessed to remove noise and distorting effects within the input data (e.g., remove outliers that would bias the input data).

In some embodiments, at block 806, the input data may include historical data for the farm (e.g., one or more weather attributes, one or more soil and land characteristics, one or more remote sensing inputs, one or more farm inputs, and/or the one or more other inputs, such as neighborhood information on pests and/or diseases), as well as data output from one or more crop phenology model modules (e.g., the one or more crop phenology model modules 410 in FIG. 4) and/or data output from one or more pest (disease)-propagation model modules (e.g., the one or more pest (disease)-propagation model modules 412 in FIG. 4). The input data may also include other historical data for the farm, such as the observed infection intensity.

The method 800 then continues by learning one or more regression models, at pixel set level, for each of one or more crop pests and/or one or more crop diseases (block 808). In some embodiments, for each of one or more given crops, at least one machine learning (ML)/crop phenology/pest (disease)-propagation model may be trained over a set of training data (i.e., the input data received at block 806) for each of one or more pests and/or one or more diseases which may affect that given crop. The method 800, at block 808, may utilize a regression learner (e.g., the regression learner 402 in FIG. 4) that employs logistic regression, support vector regression, and/or deep neural regression to learn the one or more regression models. For example, logistic regression, support vector regression, and/or deep neural regression may be employed with respect to historical data (e.g., one or more weather attributes, one or more soil and land characteristics, one or more remote sensing inputs, one more farm inputs, and/or one or more other inputs, such as neighborhood information on pests and/or diseases), as well as data output from one or more crop phenology model modules and/or data output from one or more pest (disease)-propagation model modules.

The method 800 may then continue by applying the one or more regression models, at pixel set level, for each of one or more crop pests and/or one or more crop diseases to one or more testing instance (block 810). For example, once the one or more regression models is/are learned, the method 800, at block 810, may apply the one or more regression models to data that have not been seen before (e.g., data from one more testing instance outside the training data), and make predictions about those data for purposes of validating the one or more regression models.

Figure 9:
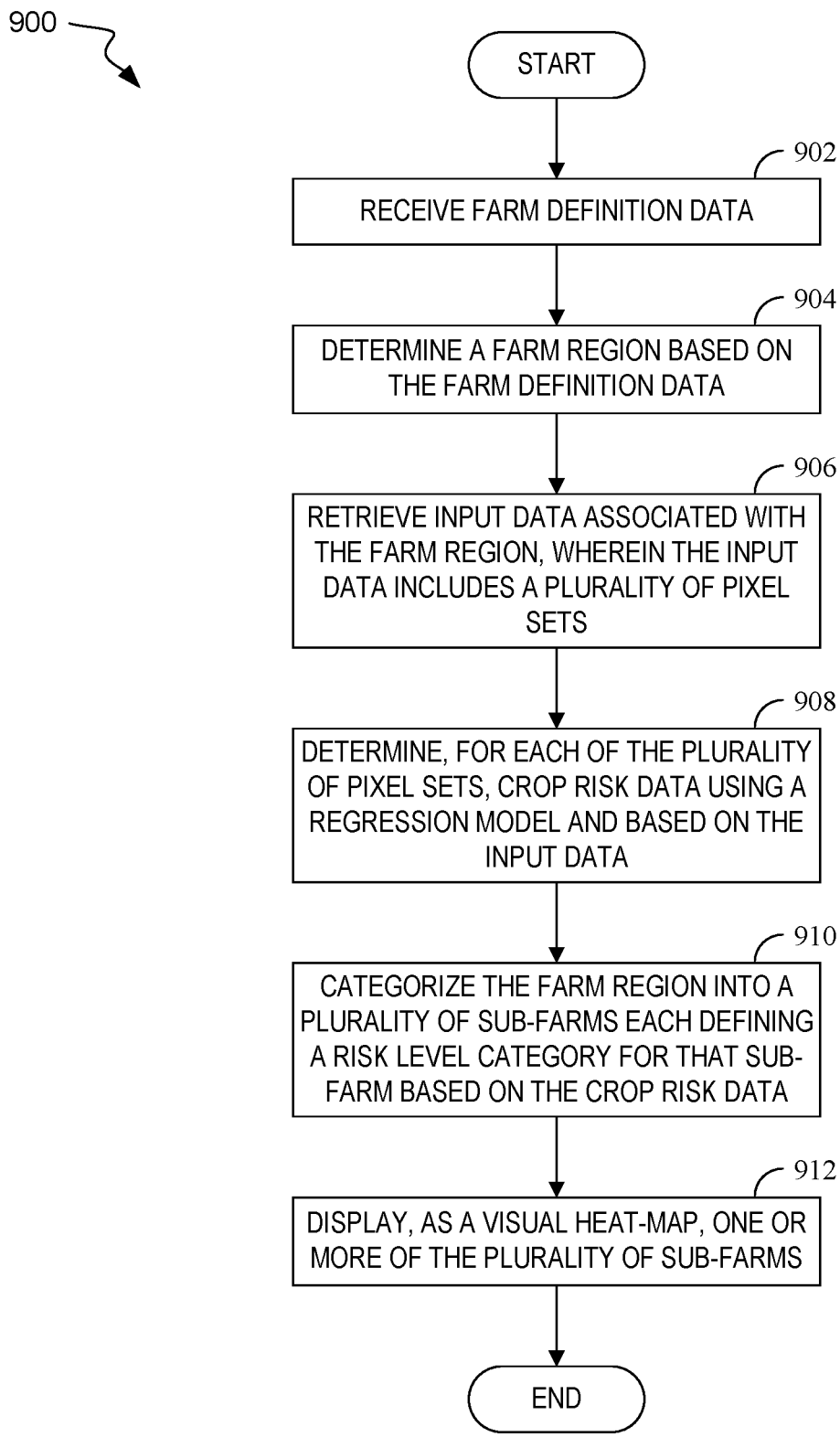
FIG. 9 depicts a flow diagram of an illustrative method of estimating crop pest risk and/or crop disease risk at sub-farm level, according to one or more embodiments.

Referring now to FIG. 9, a flow diagram of an illustrative method 900 of estimating crop pest risk and/or crop disease risk at sub-farm level is depicted, in accordance with one or more embodiments. The method 900 sets forth the preferred order of the blocks. It must be understood, however, that the various blocks may occur at any time relative to one another.

The method 900 begins by receiving farm definition data (block 902). For example, at block 902, farm definition data may be received by one or more pest and/or disease prediction modules on a server device. In some embodiments, the farm definition data may be included within a pest and/or disease prediction request sent by a grower using a client device to request estimation of crop pest risk and/or crop disease risk at sub-farm level within the grower's farm. For example, the client device may send the request, which includes farm definition data in the form of GPS-derived geolocation data defining the grower's farm. In some embodiments, the client device may send the request, which includes farm definition data in form of a Common Land Unit (CLU) defining the grower's farm. In some embodiments, the farm definition data may additionally include plantation information, such as crop type, seed variety used, sowing date, and the like; as well as pest/disease information, such as one or more crop pests and/or one or more crop diseases that the grower has selected for inclusion in the estimation.

The method 900 continues by determining a farm region based on the farm definition data (block 904). For example, at block 904, one or more pest and/or disease prediction modules on a server device may determine a farm region based on the GPS-derived geolocation data and/or the CLU received in block 902.

Next, the method 900 continues by retrieving input data associated with the farm region, wherein the input data includes a plurality of pixel sets (block 906). In some embodiments, at block 906, the method 900 may retrieve input data associated with the farm region (e.g., the farm defined by the farm definition data received in block 902). In some embodiments, at block 906, the method 900 may retrieve input data directly or indirectly associated with the farm region (e.g., an "extended farm" encompassing the farm defined by the farm definition data received in block 902, as well as one or more neighboring farms). In some embodiments, the input data may include a plurality of pixel sets (at least one pixel), with each pixel set defining the smallest possible/permissible resolution of the farm from which data can be meaningfully collected. In some embodiments, the input data retrieved in block 906 may be preprocessed to remove noise and distorting effects within the input data (e.g., remove outliers that would bias the input data).

In some embodiments, at block 906, the input data may include historical, current, and/or forecast data for the farm (e.g., one or more weather attributes, one or more soil and land characteristics, one or more remote sensing inputs, one or more farm inputs, and/or the one or more other inputs, such as neighborhood information on pests and/or diseases), as well as data output from one or more crop phenology model modules (e.g., the one or more crop phenology model modules 410 in FIG. 4) and/or data output from one or more pest (disease)-propagation model modules (e.g., the one or more pest (disease)-propagation model modules 412 in FIG. 4).

The method 900 then continues by determining, for each of the plurality of pixel sets, crop risk data using one or more regression models and based on the input data (block 908). In some embodiments, the crop risk data may include an estimate of crop pest risk for each of the plurality of pixel sets and/or an estimate of crop disease risk for each of the plurality of pixel sets. For each pixel set within the input data identified in block 906 as directly or indirectly associated with the farm region, the method 900 may deploy at least one function to compute the risk of crop pest and/or crop disease of that pixel set. For example, at block 908, for each of the plurality of pixel sets, the method 900 may apply one or more regression models built by the method 800 in FIG. 8. In some embodiments, at block 908, the method 900 may apply different regression models for different combinations of crops and crop pests and/or crop diseases. In some embodiments, those different regression models may utilize different portions of the input data.

In some embodiments, at block 908, determining the crop risk data may include determining, for each of the plurality of pixel sets, temporal crop risk data at each of a plurality of different points in time. For example, the temporal crop risk data may include a time series of arrays $(a_1, a_2, \ldots, a_n)$ each of which may constitute an array $a_i$ of tuples<Time Stamp, Risk Value>predicted at time $t_i$. The temporal crop risk data may include, for example, an array $a_i$ of tuples<Time Stamp=$t_1$, Risk Value$_{t1}$>predicted at time $t_1$, an array $a_2$ of tuples<Time Stamp=$t_2$, Risk Value$_{t2}$>predicted at time $t_2$, . . . , and an array $a_n$ of tuples <Time Stamp=$t_n$, Risk Value$_{tn}$>predicted at time $t_n$. Each tuple corresponds with a "pixel set" of the farm. In some embodiments, the temporal crop risk data may be output by a regression learner (e.g., the regression learner 402 in FIG. 4 or the regression learner 508 in FIG. 5).

The method 900 then continues by categorizing the farm region into a plurality of sub-farms each defining a risk level category (e.g., high risk, medium risk, low risk, or no risk) for that sub-farm based on the crop risk data (block 910). For example, based on an estimation of crop pest risk and/or crop disease risk at the given pixel set of the farm region at a particular point in time, the method 900, at block 910, may utilize a categorization method to categorize the sub-farms of the farm region into various risk categories, at any given time. In some embodiments, given a set of scores (e.g., a Risk Value for each of the pixel sets) and risks associated with those scores, a reporting engine (e.g., the reporting engine 510 in FIG. 5) may create a category map that maps each sub-farm region into a category, for the given time. The reporting engine may then generate from the category map one or more color-coded heat maps by associating different "heat levels" to different risk levels of the sub-farm areas (e.g., associating "hot" colors to "risky" sub-farms and associating "cool" colors to "less risky" sub-farms), for the given time.

In some embodiments, at block 910, categorizing the farm region into a plurality of sub-farms may include implementing a sub-block extension process that determines whether to combine adjoining pixel sets to form a bigger risk block within the sub-farm.

In some embodiments, at block 910, categorizing the farm region into a plurality of sub-farms may include categorizing the farm region, at each of the plurality of different points in time, into a plurality of sub-farms each defining a risk level category for that sub-farm at that point in time based on the temporal crop risk data (determined in block 908) at each of the plurality of different points in time. For example, a reporting engine (e.g., the reporting engine 510 in FIG. 5) may create a temporal view in which the category and heat level of each sub-farm area changes over time (e.g., sub-farm areas may merge and/or split over time).

The method 900 then continues by displaying, as a visual heat-map, one or more of the plurality of sub-farms (block 912). For example, the visual heat-map may be displayed on a display (e.g., the display 1142 in FIG. 11 and/or the integrated display/touch screen 1204 in FIG. 12) of a client device used by the grower to send the pest and/or disease prediction request.

In some embodiments, at block 912, the grower may select one or more visual heat-maps for display from among the plurality of different points in time. For example, the grower user may select for display one or more visual heat-maps from among a visual heat-map at time=$t_0$, a visual heat-map at time=$t_1$, a visual heat-map at time=$t_2$, . . . , and a visual heat-map at time=$t_n$. For example, the category and heat level of each sub-farm area in those visual heat-maps may change over time (e.g., sub-farm areas may merge and/or split over time).

In cases where a P&D risk is detected and an antidote to address the P&D is known, the antidote may be superimposed on a spatio-temporal map, such as a visual heat-map. For example, recommended antidotes (e.g., medicines, activities, and the like) likely to prevent the P&D from arriving and/or spreading (or at least delay arrival of the P&D and/or reduce the spread of the P&D) may be mapped on the given sub-farm level spaces of such a spatio-temporal map at a given point in time. Medicines that may be recommended as antidotes include, but are not limited to, applying one or more pesticides, applying one or more herbicides, applying one or more fungicides, and the like. Activities that may be recommended as antidotes include, but are not limited to, applying fertilizer, activating irrigation equipment, and the like. For example, the key/antidote window 1210 in FIG. 12 maps antidotes with respect to the sub-farms displayed in the visual heat-map window 1208.

Figure 10:
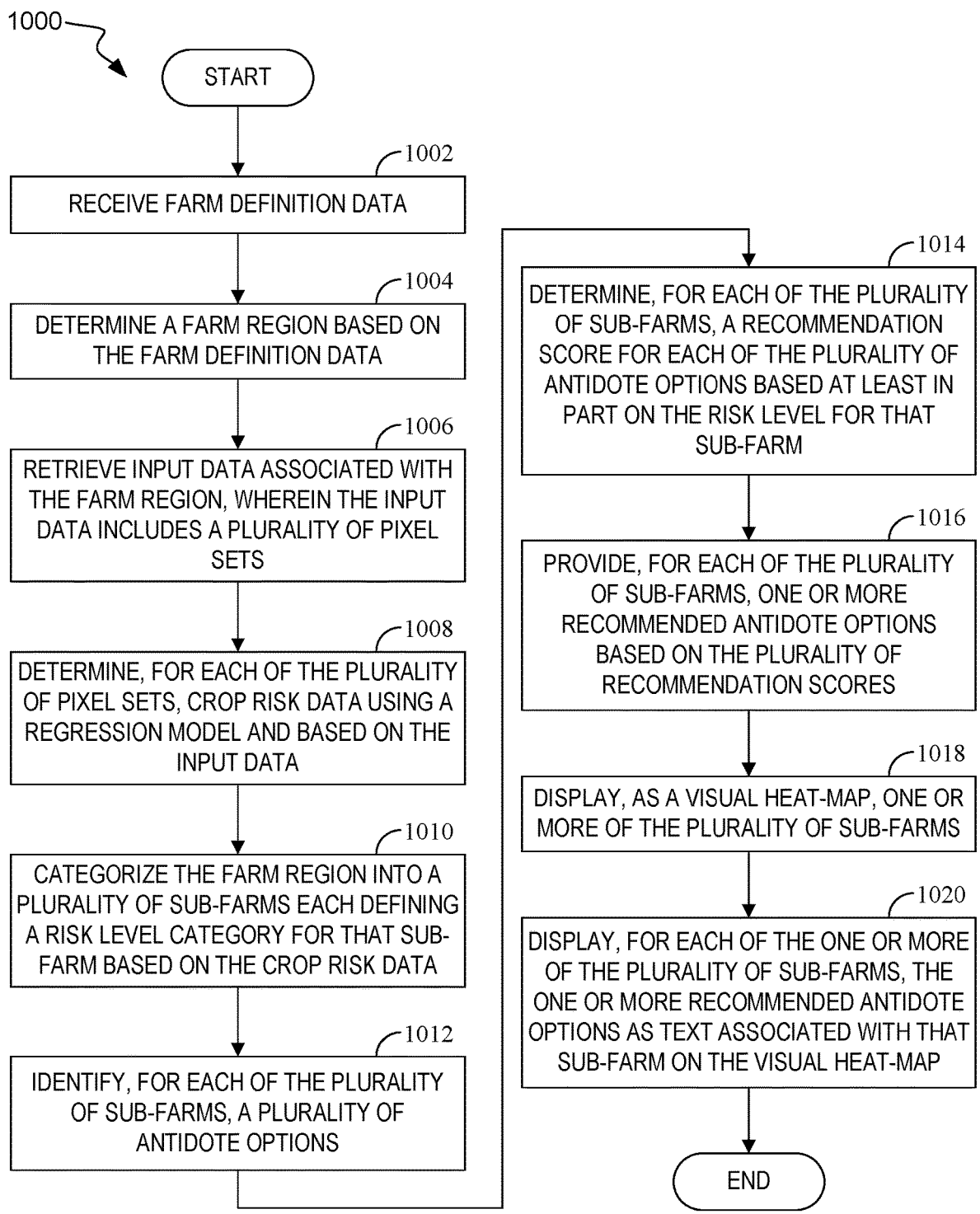
FIG. 10 depicts a flow diagram of an illustrative method of estimating crop pest risk and/or crop disease risk at sub-farm level and recommending one or more antidotes, according to one or more embodiments.

Referring now to FIG. 10, a flow diagram of an illustrative method 1000 of estimating crop pest risk and/or crop disease risk at sub-farm level and recommending one or more antidotes is depicted, in accordance with one or more embodiments. The method 1000 sets forth the preferred order of the blocks. It must be understood, however, that the various blocks may occur at any time relative to one another.

The method 1000 begins by receiving farm definition data (block 1002). Block 1002 in FIG. 10 may correspond to block 902 of method 900 shown in FIG. 9.

The method 1000 continues by determining a farm region based on the farm definition data (block 1004). Block 1004 in FIG. 10 may correspond to block at block 904 of method 900 shown in FIG. 9.

The method 1000 continues by retrieving input data associated with the farm region, wherein the input data includes a plurality of pixel sets (block 1006). Block 1006 in FIG. 10 may correspond to block 906 of method 900 shown in FIG. 9.

Next the method 1000 then continues by determining, for each of the plurality of pixel sets, crop risk data using one or more regression models and based on the input data (block 1008). Block 1008 in FIG. 10 may correspond to block 908 of method 900 shown in FIG. 9.

The method 1000 then continues by categorizing the farm region into a plurality of sub-farms each defining a risk level category (e.g., high risk, medium risk, low risk, or no risk) for that sub-farm based on the crop risk data (block 1010). Block 1010 in FIG. 10 may correspond to block 910 of method 900 shown in FIG. 9.

The method 1000 then continues by identifying, for each of the plurality of sub-farms, a plurality of antidote options (block 1012). For example, at block 1012, the method 1000 may identify, for each of the plurality of sub-farms, a plurality of antidote options by accessing one or more antidote databases (e.g. the one or more antidote databases 1128 in FIG. 11) containing antidote information for different P&D situations.

In some embodiments, at block 1012, the method 1000 may identify, for each of the plurality of sub-farms, a plurality of sub-farm temporal antidote options defining antidote options for that sub-farm at a plurality of points in time.

The method 1000 then continues by determining, for each of the plurality of sub-farms, a recommendation score for each of the plurality of antidote options based at least in part on the risk level for that sub-farm (block 1014). For example, at block 1014, the method 1000 may determine, for each of the plurality of sub-farms, a recommendation score for each of the plurality of antidote options using one or more simulation models to simulate the effectiveness of a given antidote option at the risk level for given sub-farm.

The method 1000 then continues by providing, for each of the plurality of sub-farms, one or more recommended antidote options based on the plurality of recommendation scores (block 1016). For example, at block 1016, the method 1000 may provide, for each of the plurality of sub-farms, a single recommended antidote option based on the antidote option having the best recommendation score. In an illustrative example, a single recommended antidote option for each of a plurality of sub-farms is illustrated by the key/antidote window 1210 in FIG. 12, wherein "Prescription X" is the recommended antidote option for the High Risk sub-farm, "Prescription Y" is the recommended antidote option of the Medium Risk sub-farm, "Prescription Z" is the recommended antidote option for the Low Risk sub-farm, and "No Action" is the recommended antidote option for the No Risk sub-farm.

In some embodiments, in cases where the grower has a planned plantation, the one or more recommended antidote options for the P&D may also be examined for safety with respect to the grower's planned plantation. If a given recommended antidote option is safe for the grower's planned plantation, then the recommended antidote option may be generated as-is for display, with a detailed map of the location and the time at which the recommended antidote is to be performed (e.g., one or more medicines applied and/or activities carried out). On the other hand, if a given recommended antidote option is not safe for the grower's planned plantation, then one or more alternative recommended antidote options (if existing) may be suggested (e.g., based on the antidote option(s) having the "next-best" recommendation score(s)). Otherwise, one or more alternative plantation requirements (if existing) may be suggested by, for example, using one or more external recommendation systems of choosing plantations for a given set of conditions (e.g., given parameters such as soil type, soil moisture, weather/climate, and the like).

In an illustrative example, a grower's planned plantation involves using only organic farming techniques. In this example, at block 1016, the method 1000 may generate a given recommended antidote option as-is for display as long as that given recommended antidote option meets all necessary organic farming certification requirements.

The method 1000 then continues by displaying, as a visual heat-map, one or more of the plurality of sub-farms (block 1018). Block 1018 in FIG. 10 may correspond to block 912 of method 900 shown in FIG. 9.

The method 1000 then continues by displaying, for each of the one or more of the plurality of sub-farms, the one or more recommended antidote options as text associated with that sub-farm on the visual heat-map (block 1020). For example, at block 1020, the method 1000 may display, for each of one or more of a plurality of sub-farms, a single antidote option as text associated with that sub-farm on the visual heat-map (e.g., the key/antidote window 1210 in FIG. 12, wherein "Prescription X" is the recommended antidote option for the High Risk sub-farm, "Prescription Y" is the recommended antidote option of the Medium Risk sub-farm, "Prescription Z" is the recommended antidote option for the Low Risk sub-farm, and "No Action" is the recommended antidote option for the No Risk sub-farm).

Figure 11:
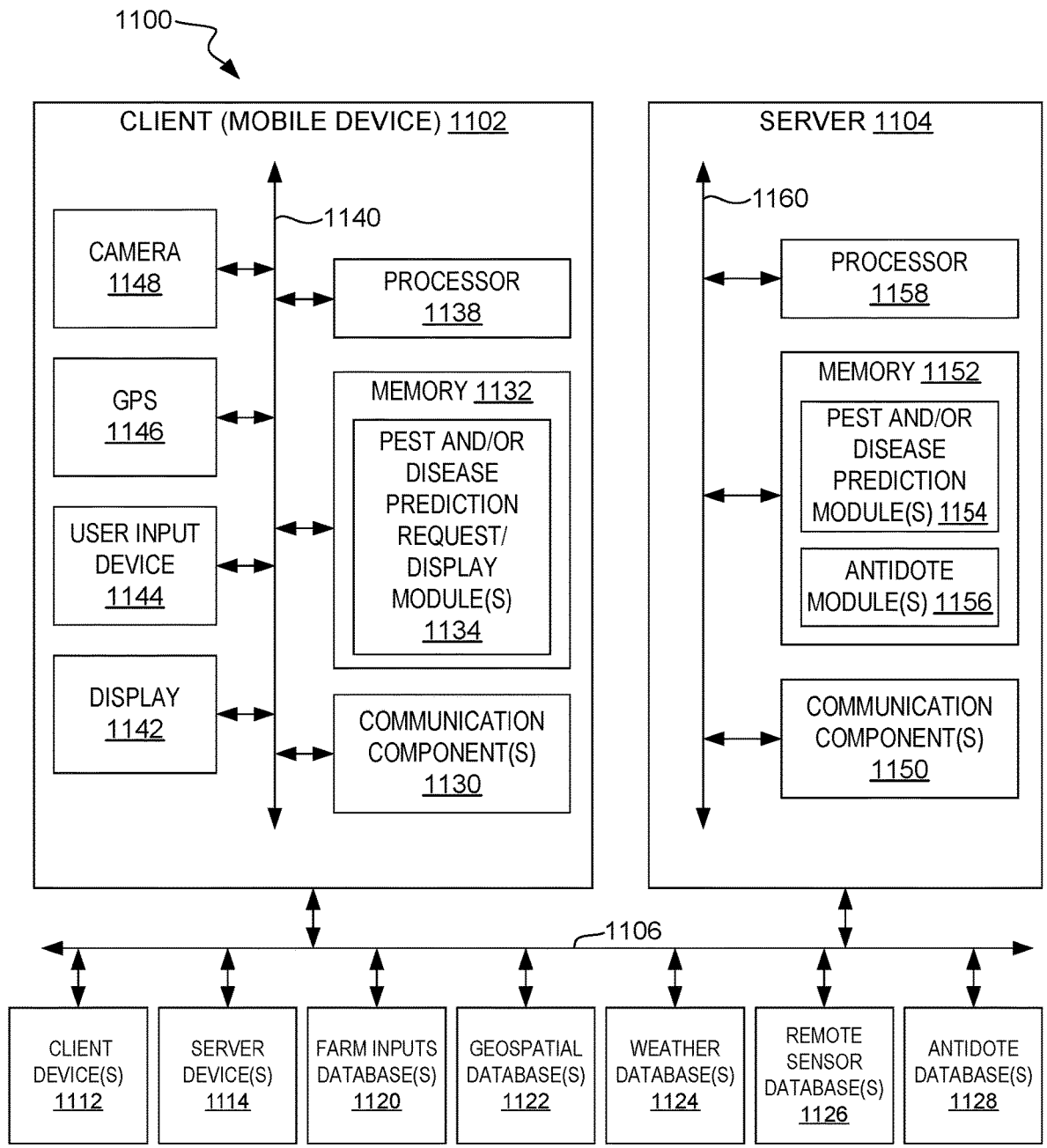
FIG. 11 depicts a block diagram of an example, non-limiting system that facilitates estimation of crop pest risk and/or crop disease risk at sub-farm level and recommendation of one or more antidotes, according to one or more embodiments.

Referring now to FIG. 11, a block diagram of an example, non-limiting system 1100 is depicted that facilitates estimation of crop pest risk and/or crop disease risk at sub-farm level and recommendation of one or more antidotes, in accordance with one or more embodiments. Repetitive description of like elements employed in other embodiments described herein is omitted for the sake of brevity. Aspects of systems (e.g., system 1100 and the like), apparatuses, or processes explained in this disclosure may constitute machine-executable program module(s) embodied within machine(s), e.g., embodied in one or more computer readable mediums (or media) associated with one or more machines. Such program module(s), when executed by the one or more machines, e.g., one or more computers, one or more computing devices, one or more virtual machines, etc., may cause the one or more machines to perform the operations described.

As shown in FIG. 11, the system 1100 may include one or more client systems (e.g., mobile devices) 1102, 1112, one or more server systems 1104, 1114, one or more networks 1106, one or more farm inputs databases 1120, one or more geospatial databases 1122, one or more weather databases 1124, one or more remote sensor databases 1126, and one or more antidote databases 1128. It is to be appreciated that the one or more client systems 1102, 1112, the one or more server systems 1104,1114, the one or more farm inputs databases 1120, the one or more geospatial databases 1122, the one or more weather databases 1124, the one or more remote sensor databases 1126, and the one or more antidote databases 1128 may be equipped with communication devices (e.g., one or more communication components 1130, described below, with respect to the client system 1102) that enable communication between the one or more client systems 1102, 1112, the one or more server systems 1104, 1114, the one or more farm inputs databases 1120, the one or more geospatial databases 1122, the one or more weather databases 1124, the one or more remote sensor databases 1126, and the one or more antidote databases 1128 over the one or more networks 1106.

Client systems 1102, 1112 may include the functionality described herein with respect to requesting estimation of crop pest risk and/or crop disease risk and recommendation of one or more antidotes, and displaying the results of the estimation and recommendation. One or more client systems 1102, 1112 may be used to send pest and/or disease prediction requests to the one or more server systems 1104, 1114 and to display the results of the estimations returned from the one or more server systems 1104, 1114. For example, requests for estimation of crop pest risk and/or crop disease risk may originate from farmers and agribusinesses such as commodity trading, seed supply, pesticide manufacturing, and logistic services, as well as government entities. Client system 1112 may be a different type of client system than client system 1102. Client system 1112 may also be a client system 1102 and/or include one or more components of client system 1102. It is to be appreciated that in discussions below where more than one client system is employed, the client system may include one or more client systems 1102 and/or one or more client systems 1112.

Client systems 1102, 1112 may include, for example, one or more mobile phones (e.g., 1202 in FIG. 12), tablets, PDAs, laptops, or other mobile devices.

Server systems 1104, 1114 may include the functionality described herein with respect to estimating crop pest risk and/or crop disease risk and recommending one or more spatio-temporal antidotes. Server system 1114 may be a different type of client system than server system 1104. Server system 1114 may also be a server system 1104 and/or include one or more components of server system 1104. It is to be appreciated that in discussions below where more than one server system is employed, the server systems may include one or more server systems 1104 and/or one or more server systems 1114.

The various components (e.g., client systems 1102, 1112, server systems 1104, 1114, farm inputs databases 1120, geospatial databases 1122, weather databases 1124, remote sensor databases 1126, antidote databases 1128, communication components 1130, 1150, memory 1132, 1152, processor 1138, 1158, display 1142, keyboard 1144, GPS 1146, camera 1148, and/or other components) of system 1100 may be connected directly or via one or more networks 1106. Such networks 1106 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Mal, WLAN, radio communication, microwave communication, satellite communication, optical communication, sonic communication, electromagnetic induction communication, quantum communication, and/or any other suitable communication technology.

Client system 1102 may include one or more communication components 1130 that enable client system 1102 to communicate with one or more server systems 1104, 1114, one or more other client devices 1112, one or more farm inputs databases 1120, one or more geospatial databases 1122, one or more weather databases 1124, one or more remote sensor databases 1126, and/or one or more antidote databases 1128 over one or more networks 1106 via wireless and/or wired communications. For example, the one or more communication components 1130 may correspond to network adapter 20 in FIG. 1.

Client system 1102 may include or otherwise be associated with at least one memory 1132 that may store computer executable program module(s) (e.g., computer executable program module(s) may include, but are not limited to, pest and/or disease prediction request/display module(s) 1134 and associated program module(s)). Pest and/or disease prediction request/display module(s) 1134 may correspond to program modules 42 in FIG. 1. Client system 1102 may also include or otherwise be associated with at least one processor 1138 that executes the computer executable program module(s) stored in the memory 1132. Client system 1102 may further include a system bus 1140 that may couple the various components including, but not limited to, communication component(s) 1130, memory 1132, processor 1138, display 1142, user input device 1144, GPS 1146, camera 1148, and/or other components (e.g., accelerometer, gyroscope, magnetometer).

While the client system 1102 is shown in FIG. 11 as including pest and/or disease prediction request/display module(s) 1134, in other embodiments, any number of different types of devices may be associated with or include all or some of the pest and/or disease prediction request/display module(s) 1134. For example, one or more server systems 1104, 1114 may include all or some of the pest and/or disease prediction request/display module(s) 1134. In other words, data processing associated with requesting estimation of crop pest risk and/or crop disease risk and displaying the results of the estimation may be performed locally (e.g., using the processor 1138) and/or remotely (e.g., at server system 1104 using processor 1158). All such embodiments are envisaged.

Client system 1102 may also include or otherwise be associated with at least one display 1142 that may display estimation results, as well as information related to using the pest and/or disease prediction request/display module(s) 1134 (e.g., describing one or more input options by which the farm definition data may be input, such as keying in coordinates that define the farm region, keying in a Common Land Unit (CLU) that defines the farm region, using GPS-derived geolocation data that define the farm region, and/or using image data that defines the farm region). The display 1142 may be any suitable display device. For example, the display 1142 may be a display that is integrated into a mobile phone, tablet, PDA, or laptop. In other embodiments, the display 1142 may be a component of a device communicatively coupled to a mobile phone, tablet, PDA, or laptop. In some embodiments, the display 1142 may be a touch screen that allows a user to interact with the client system 1102 using her/his finger or stylus.

Client system 1102 may also include or otherwise be associated with at least one user input device 1144, such as a keyboard and/or a pointing device (e.g., a graphics tablet, mouse, stylus, pointing stick, trackball, etc.), by which a user may provide input data (e.g., input data defining the farm region). The user input device 1144 may be any suitable user input device. For example, the user input device 1144 may be a keyboard and/or a pointing device integrated into a mobile phone, tablet, PDA, or laptop. In other embodiments, the user input device 1144 may be a component of a device communicatively coupled to a mobile phone, tablet, PDA, or laptop.

Client system 1102 may also include or otherwise be associated with at least one GPS 1146 that may provide geolocation data (e.g., geolocation data defining the farm region). The GPS 1146 may be any suitable global satellite-based geolocation system, such as the Global Positioning System (GPS), GLObal Navigation Satellite System (GLONASS), Galileo, Quasi-Zenith Satellite System (QZSS), etc. For example, the GPS 1146 may be a global satellite-based geolocation system that is integrated into a mobile phone, tablet, PDA, or laptop. In other embodiments, the GPS 1146 may be a component of a device communicatively coupled to a mobile phone, tablet, PDA, or laptop.

Client system 1102 may also include or otherwise be associated with at least one camera 1148 that may capture an image (e.g., an image of a land plat map or other image defining the farm region). The camera 1148 may be any suitable image capture device. For example, the camera 1148 may be a camera that is integrated into a mobile phone, tablet, PDA, or laptop. In other embodiments, the camera

1148 may be a component of a device communicatively coupled to a mobile phone, tablet, PDA, or laptop.

Server system 1104 may include one or more communication components 1150 that enable server system 1104 to communicate with one or more client systems 1102, 1112, one or more other server devices 1114, one or more farm inputs databases 1120, one or more geospatial databases 1122, one or more weather databases 1124, one or more remote sensor databases 1126, and/or one or more antidote databases 1128 over one or more networks 1106 via wireless and/or wired communications. For example, the one or more communication components 1150 may correspond to network adapter 20 in FIG. 1.

Server system 1104 may include or otherwise be associated with at least one memory 1152 that may store computer executable program module(s) (e.g., computer executable program module(s) may include, but are not limited to, pest and/or disease prediction module(s) 1154, antidote module(s) 1156, and associated program module(s)). Pest and/or disease prediction module(s) 1154 and antidote module(s) 1156 may correspond to the program modules 42 in FIG. 1. Pest and/or disease prediction module(s) 1154 may also correspond to the pest and/or disease prediction modules 506 in FIG. 5. Server system 1104 may also include or otherwise be associated with at least one processor 1158 that executes the computer executable program module(s) stored in the memory 1152. Server system 1104 may further include a system bus 1160 that may couple the various components including, but not limited to, communication component(s) 1150, memory 1152, processor 1158, and/or other components.

While the server system 1104 is shown in FIG. 11 as including the pest and/or disease prediction module(s) 1154 and the antidote module(s) 1156, in other embodiments, any number of different types of devices may be associated with or include all or some of the pest and/or disease prediction module(s) 1154 and/or the antidote module(s) 1156. For example, one or more client systems 1102, 1112 may include all or some of the pest and/or disease prediction module(s) 1154 and/or the antidote module(s) 1156. In other words, data processing associated with the pest and/or disease prediction module(s) 1154 and/or the antidote module(s) 1156 may be performed locally (e.g., using the processor 1158) and/or remotely (e.g., at client system 1102 using processor 1138). All such embodiments are envisaged.

The one or more farm inputs databases 1120 may be any database, non-limiting examples of which include one or more databases that store farm inputs data (e.g., pesticide, herbicide, fungicide, fertilizer, irrigation, and the like). The one or more farm inputs databases 1120 may store farm input data corresponding to the farm inputs 426 in FIG. 4.

The one or more geospatial databases 1122 may be any database, non-limiting examples of which include one or more databases that store geospatial data (e.g., soil type, soil composition, soil depth, soil moisture, land elevation and slope, and the like). The one or more geospatial databases 1122 may store geospatial data correspond to the soil and land characteristics 422 in FIG. 4.

The one or more weather databases 1124 may be any database, non-limiting examples of which include one or more databases that store weather data (e.g., temperature, humidity, wind speed, precipitation, and the like). The one or more weather databases 1124 may store weather data corresponding to the weather attributes 420 in FIG. 4.

The one or more remote sensor databases 1126 may be any database, non-limiting examples of which include one or more databases that store remote sensor data (e.g., vegetation indices, backscattering, and the like). The one or more remote sensor databases 1126 may store remote sensor data corresponding to the remote sensor inputs 424 in FIG. 4.

The one or more antidote databases 1128 may be any database, non-limiting examples of which include one or more databases that store antidote data (e.g., antidote information for different P&D situations). For example, the one or more antidote databases 1128 may contain scouting practices, treatment methods, and other antidote information to respond to P&D risks, at different P&D growth stages, affecting each of a plurality of crops, at different crop growth stages.

Figure 12:
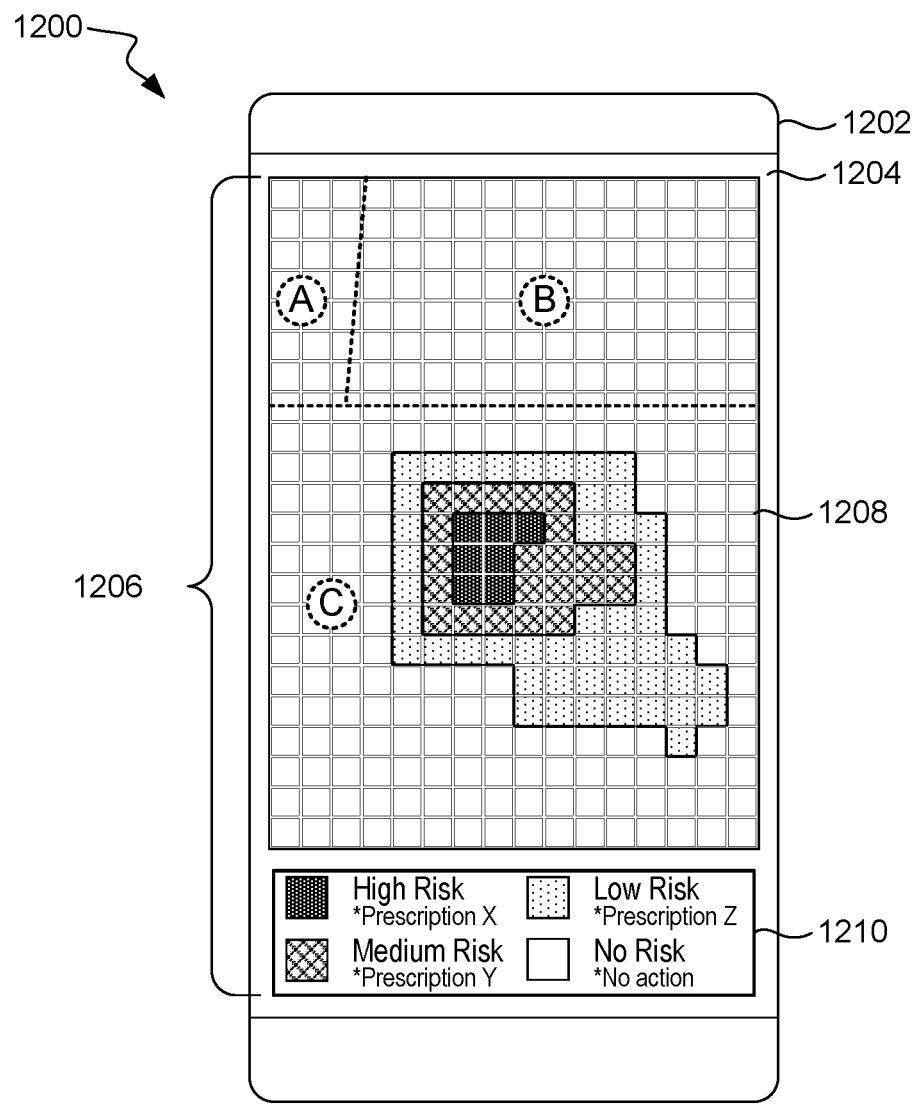
FIG. 12 depicts an exemplary client system for requesting estimation of crop pest risk and/or crop disease risk at sub-farm level and recommendation of one or more antidotes, and displaying the results of the estimation and recommendation, according to one or more embodiments.

Referring now to FIG. 12, an exemplary client system 1200 is depicted for requesting estimation of crop pest risk and/or crop disease risk at sub-farm level and recommendation of one or more antidotes and displaying the results of the estimation and recommendation, in accordance with one or more embodiments. The exemplary client system 1200 may correspond to client systems 1102, 1112 in FIG. 11. The exemplary client system 1200 illustrated in FIG. 12 comprises a mobile phone 1202 with an integrated display/touch screen 1204. In other embodiments, the client system may be a tablet, PDA, laptop, or other client device, including a mobile phone having a different configuration. Displayed on the integrated display/touch screen 1204, in accordance with some embodiments, are results 1206 of an estimation of estimation of crop pest risk and/or crop disease risk at sub-farm level and recommendation of one or more antidotes returned by a server system (e.g., 1104 in FIG. 11) in response to a request for estimation of crop pest risk and/or crop disease. The client system 1200 may have earlier sent the request, which may have included GPS-derived geolocation data defining the farm region, to the client system. For example, the mobile phone 1202 may include an integrated GPS (1146 in FIG. 11) and the phone's GPS-derived geolocation data may define the farm region (e.g., the pest and/or disease prediction request/display module(s) (1134 in FIG. 11) may define as the farm region the CLU in which the mobile phone 1202 is located).

In the embodiment illustrated in FIG. 12, the results 1206 of an estimation of crop pest risk and/or crop disease risk are displayed using a graphical user interface (GUI) that includes one or more windows (e.g., one or more windows, such as a visual heat-map window 1208 and a key/antidote window 1210), icons, and/or buttons that allow a user to interact with the displayed results. For example, the GUI may allow a user may interact with the displayed results to show the entire farm region in the visual heat-map window 1208, or a portion of the farm region (e.g., using a zoom feature). In the embodiment illustrated in FIG. 12, the visual heat-map window 1208 displays a visual heat map that corresponds with the visual heat map 600 in FIG. 6. Also, in the embodiment illustrated in FIG. 12, the key/antidote window 1210 displays a key to the visual heat-map's fill graphics for each sub-farm and a recommended antidote for each sub-farm. It should be understood that the GUI configuration and functions shown in FIG. 12 are intended to be illustrative only and embodiments of the invention are not limited thereto. For example, the results of an estimation of crop pest risk and/or crop disease risk may be displayed using a text-based user interface.

Also, in the embodiment illustrated in FIG. 12, the recommended antidotes are presented as text in the key/antidote window 1210. This configuration is for purposes of illustration, not limitation. The recommended antidotes may be presented in any suitable manner and in any suitable location. The recommended antidotes may be spatio-temporal prescriptions tailored with respect to both space (e.g., the recommended antidotes may vary from sub-farm to sub-farm) and time (e.g., the recommended antidotes may vary over time).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. For example, the particular hardware and software implementation details described herein are merely for illustrative purposes and are not meant to limit the scope of the described subject matter. Thus, while the present invention has been particularly shown and described with reference to preferred embodiments thereof, it will be understood by those skilled in the art that changes in form and details may be made therein without departing from the spirit and scope of the present invention.

What is claimed is:

1. A computer-implemented method of estimating crop pest risk and/or crop disease risk at sub-farm level, the method comprising:
    defining a farm and a farm region using farm definition data in a form of GPS-derived geolocation data obtained from a global satellite-based geolocation system, wherein the farm region encompasses an extended farm encompassing the farm defined by the farm definition data, and one or more neighboring farms;
    inputting, into a regression learner comprising a plurality of regression models, wherein the plurality of regression models include at least one machine learning (ML)/crop phenology/pest(disease)-propagation model for at least one pest and/or at least one disease, a course resolution pest and/or disease (P&D) risk profile of the farm and one or more pest and/or disease pixel level inputs, wherein the course resolution P&D risk profile of the farm is utilized by the regression learner as a predictor variable of the one or more regression models and includes a risk profile at time=$t_0$ displayed as a shape element representing the farm and a fill pattern within the shape element reflecting an estimation of pest risk or crop disease risk within the farm at the time $t_0$;
    outputting, from the regression learner, a time series of arrays based on the one or more pest and/or disease pixel level inputs and course resolution P&D risk profile, wherein each of the arrays is a tuple corresponding with pixel sets of the farm region comprising a pest and/or disease risk value predicted at a time stamp ranging from $t_0$ to $t_n$ for each pixel set of the arrays;
    generating a high-resolution P&D risk map at the sub-farm level from the time series of arrays, the high-resolution P&D risk map comprising a matrix of the pixel sets of the farm region being displayed as shape elements containing fill patterns at the times from $t_0$ to $t_n$;
    displaying, the high resolution P&D risk map at the sub-farm level as a visual heat-map for each of the sub-farms based on a plurality of user-selected points in time, wherein the high resolution P&D risk map utilizes one or more colors corresponding to one or more risk levels for each of a plurality of sub-farm areas, wherein the plurality of sub-farm areas are expanded or divided over time according to a sub-block extension process;
    determining, for each of the plurality of sub-farm areas, a recommendation score for each of a plurality of antidote options based at least in part on the risk value for each of the plurality of sub-farm areas, wherein the recommendation score for each of the plurality of antidote options is determined using one or more simulation models to simulate an effectiveness of each of the plurality of antidote options at a risk level for each of the plurality of sub-farm areas;
    providing, for each of the plurality of sub-farm areas, one or more recommended antidote options from the plurality of antidote options based on the recommendation score, wherein the one or more recommended antidote options identified for each of the plurality of sub-farm areas is displayed using text on the visual heat-map for each of the user-selected points in time, wherein the one or more recommended antidote options include a location and a time in which the one or more recommended antidote options is to be performed and are examined for safety with respect to a planned plantation of the user; and
    determining at least one of the antidote options is unsafe for the planned plantation of the user and displaying one or more alternative antidote options based on next-best recommendation scores, wherein the one or more alternative options are displayed within an antidote window of the high resolution P&D risk map according to the next-best recommendation scores.

2. The method as recited in claim 1, further comprising:
    categorizing the farm region at each of a plurality of different points in time from time $t_0$ to $t_n$, into the plurality of sub-farm areas each defining a risk level category for that sub-farm at that point in time based on the temporal crop risk data at each of the plurality of different points in time.

3. The method as recited in claim 1, wherein, for each of the plurality of sub-farm areas, the antidote options include a plurality of sub-farm temporal antidote options defining antidote options for that sub-farm at a plurality of different points in time from $t_0$ to $t_n$.

4. The method as recited in claim 1, wherein the sub-block extension process further comprises:
    determining whether to expand a first sub-farm of the high resolution P&D risk map to include a candidate pixel set of a plurality of pixel sets of second sub-farm based on whether the candidate pixel set meets at least one sub-farm expansion threshold, wherein the first sub-farm adjoins the second sub-farm, and wherein the candidate pixel set is adjacent a neighboring pixel set of the plurality of pixel sets.

5. The method as recited in claim 4, further comprising:
    expanding the first sub-farm of the high resolution P&D risk map to include a candidate pixel set when a difference between the risk value of the candidate pixel set and risk value for the neighboring pixel set is less than a first sub-farm expansion threshold and difference between the risk value for the candidate pixel set and the risk value for each of the plurality of pixel sets in the first sub-farm is less than a second sub-farm expansion threshold.

6. The method as recited in claim 5, further comprising:
    receiving resolution selection data from a user, wherein the resolution selection data includes at least one of the first and second sub-farm expansion thresholds.

7. A system for estimating crop pest risk and/or crop disease risk at sub-farm level, comprising:
    a server device, wherein the server device comprises one or more processors, one or more computer readable storage devices, and program instructions stored on at least one of the one or more computer readable storage devices for execution by at least one of the one or more processors, the program instructions executable to:
        define a farm and a farm region using farm definition data in a form of GPS-derived geolocation data obtained from a global satellite-based geolocation system, wherein the farm region encompasses an extended farm encompassing the farm defined by the farm definition data, and one or more neighboring farms;

input, into a regression learner comprising a plurality of regression models, wherein the plurality of regression models include at least one machine learning (ML)/crop phenology/pest(disease)-propagation model for at least one pest and/or at least one disease, a course resolution pest and/or disease (P&D) risk profile of the farm and one or more pest and/or disease pixel level inputs, wherein the course resolution P&D risk profile of the farm is utilized by the regression learner as a predictor variable of the one or more regression models and includes a risk profile at time=$t_0$ displayed as a shape element representing the farm and a fill pattern within the shape element reflecting an estimation of pest risk or crop disease risk within the farm at the time $t_0$;

output, from the regression learner, a time series of arrays based on the one or more pest and/or disease pixel level inputs and course resolution P&D risk profile, wherein each of the arrays is a tuple corresponding with pixel sets of the farm region comprising a pest and/or disease risk value predicted at a time stamp ranging from $t_0$ to $t_n$ for each pixel set of the arrays; and generate a high-resolution P&D risk map at the sub-farm level from the time series of arrays, the high-resolution P&D risk map comprising a matrix of the pixel sets of the farm region being displayed as shape elements containing fill patterns at the times from $t_0$ to $t_n$;

display, the high resolution P&D risk map at the sub-farm level as a visual heat-map for each of the sub-farms based on a plurality of user-selected points in time, wherein the high resolution P&D risk map utilizes one or more colors corresponding to one or more risk levels for each of a plurality of sub-farm areas, wherein the plurality of sub-farm areas are expanded or divided over time according to a sub-block extension process;

determine, for each of the plurality of sub-farm areas, a recommendation score for each of a plurality of antidote options based at least in part on the risk value for each of the plurality of sub-farm areas, wherein the recommendation score for each of the plurality of antidote options is determined using one or more simulation models to simulate an effectiveness of each of the plurality of antidote options at a risk level for each of the plurality of sub-farm areas;

provide, for each of the plurality of sub-farm areas, one or more recommended antidote options from the plurality of antidote options based on the recommendation score, wherein the one or more recommended antidote options identified for each of the plurality of sub-farm areas is displayed using text on the visual heat-map for each of the user-selected points in time, wherein the one or more recommended antidote options include a location and a time in which the one or more recommended antidote options is to be performed and are examined for safety with respect to a planned plantation of the user; and determine at least one of the antidote options is unsafe for the planned plantation of the user and displaying one or more alternative antidote options based on next-best recommendation scores, wherein the one or more alternative options are displayed within an antidote window of the high resolution P&D risk map according to the next-best recommendation scores.

8. The system as recited in claim 7, wherein the program instruction is further executable to:

categorize the farm region at each of a plurality of different points in time from time $t_0$ to $t_n$, into the plurality of sub-farm areas each defining a risk level category for that sub-farm at that point in time based on the temporal crop risk data at each of the plurality of different points in time.

9. The system as recited in claim 3, wherein the sub-block extension process further comprises, the program instruction further executable to:

determine whether to expand a first sub-farm of the high resolution P&D risk map to include a candidate pixel set of a plurality of pixel sets of second sub-farm based on whether the candidate pixel set meets at least one sub-farm expansion threshold, wherein the first sub-farm adjoins the second sub-farm, and wherein the candidate pixel set is adjacent a neighboring pixel set of the plurality of pixel sets.

10. The system as recited in claim 9, further comprising program instructions executable to:

expand the first sub-farm of the high-resolution P&D risk map to include a candidate pixel set when a difference between the risk value of the candidate pixel set and the risk value of the neighboring pixel set is less than a first sub-farm expansion threshold; and difference between the risk value for the candidate pixel set and the risk value—for each of the plurality of pixel sets in the first sub-farm is less than a second sub-farm expansion threshold.

11. The system as recited in claim 10, wherein the program instructions are further executable to:

receive resolution selection data from a user, wherein the resolution selection data includes at least one of the first and second sub-farm expansion thresholds.

12. A computer program product for estimating crop pest risk and/or crop disease risk at sub-farm level, the computer program product comprising a non-transitory computer readable storage medium having program code embodied therewith, the program code executable by one or more processors, to perform a method comprising:

defining a farm and a farm region using farm definition data in a form of GPS-derived geolocation data obtained from a global satellite-based geolocation system, wherein the farm region encompasses an extended farm encompassing the farm defined by the farm definition data, and one or more neighboring farms;

inputting, into a regression learner comprising a plurality of regression models, a course resolution pest and/or disease (P&D) risk profile of the farm and one or more pixel level inputs, wherein the course resolution P&D risk profile of the farm is utilized by the regression learner as a predictor variable of the one or more regression models and includes a risk profile at time=$t_0$ displayed as a shape element representing the farm and a fill pattern within the shape element reflecting an estimation of pest risk or crop disease risk within the farm at the time $t_0$;

outputting, from the regression learner, a time series of arrays based on the one or more pixel level inputs and course resolution P&D risk profile, wherein each of the arrays is a tuple corresponding with pixel sets of the farm region comprising risk value predicted at a time stamp ranging from $t_0$ to $t_n$ for each pixel set of the arrays; and generating a high-resolution P&D risk map at the sub-farm level from the time series of arrays, the high-resolution P&D risk map comprising a matrix of the pixel sets of the farm region being displayed as shape elements containing fill patterns at the times from $t_0$ to $t_n$;

displaying, the high resolution P&D risk map at the sub-farm level as a visual heat-map for each of the sub-farms based on a plurality of user-selected points in time, wherein the high resolution P&D risk map utilizes one or more colors corresponding to one or more risk levels for each of a plurality of sub-farm areas, wherein the plurality of sub-farm areas are expanded or divided over time according to a sub-block extension process;

determining, for each of the plurality of sub-farm areas, a recommendation score for each of a plurality of antidote options based at least in part on the risk value for each of the plurality of sub-farm areas, wherein the recommendation score for each of the plurality of antidote options is determined using one or more simulation models to simulate an effectiveness of each of the plurality of antidote options at a risk level for each of the plurality of sub-farm areas;

providing, for each of the plurality of sub-farm areas, one or more recommended antidote options from the plurality of antidote options based on the recommendation score, wherein the one or more recommended antidote options identified for each of the plurality of sub-farm areas is displayed using text on the visual heat-map for each of the user-selected points in time, wherein the one or more recommended antidote options include a location and a time in which the one or more recommended antidote options is to be performed and are examined for safety with respect to a planned plantation of the user; and determining at least one of the antidote options is unsafe for the planned plantation of the user and displaying one or more alternative antidote options based on next-best recommendation scores, wherein the one or more alternative options are displayed within an antidote window of the high resolution P&D risk map according to the next-best recommendation scores.

13. The computer program product as recited in claim 12, further comprising:
categorizing the farm region at each of a plurality of different points in time from time $t_0$ to $t_n$, into the plurality of sub-farm areas each defining a risk level category for that sub-farm at that point in time based on the temporal crop risk data at each of the plurality of different points in time.

14. The computer program product as recited in claim 12, wherein the sub-block extension process further comprises:
determining whether to expand a first sub-farm of the high resolution P&D risk map to include a candidate pixel set of a plurality of pixel sets of second sub-farm based on whether the candidate pixel set meets at least one sub-farm expansion threshold, wherein the first sub-farm adjoins the second sub-farm, and wherein the candidate pixel set is adjacent a neighboring pixel set of the plurality of pixel sets.

15. The computer program product as recited in claim 14, further comprising:

expanding the first sub-farm of the high resolution P&D risk map to include a candidate pixel set when a difference between the risk value of the candidate pixel set and risk value for the neighboring pixel set is less than a first sub-farm expansion threshold and difference between the risk value for the candidate pixel set and the risk value—for each of the plurality of pixel sets in the first sub-farm is less than a second sub-farm expansion threshold.

16. The computer program product as recited in claim 15, further comprising:
receiving resolution selection data from a user, wherein the resolution selection data includes at least one of the first and second sub-farm expansion thresholds.

17. A system for estimating crop pest risk and/or crop disease risk at sub-farm level and recommending at least one antidote, comprising:
a server device, wherein the server device comprises one or more processors, one or more computer readable storage devices, and program instructions stored on at least one of the one or more computer readable storage devices for execution by at least one of the one or more processors, the program instructions executable to:
define a farm and a farm region using farm definition data in a form of GPS-derived geolocation data obtained from a global satellite-based geolocation system, wherein the farm region encompasses an extended farm encompassing the farm defined by the farm definition data, and one or more neighboring farms;
input, into a regression learner comprising a plurality of regression models, a course resolution pest and/or disease (P&D) risk profile of the farm and one or more pixel level inputs, wherein the course resolution P&D risk profile of the farm is utilized by the regression learner as a predictor variable of the one or more regression models and includes a risk profile at time=$t_0$ displayed as a shape element representing the farm and a fill pattern within the shape element reflecting an estimation of pest risk or crop disease risk within the farm at the time $t_0$;
output, from the regression learner, a time series of arrays based on the one or more pixel level inputs and course resolution P&D risk profile, wherein each of the arrays is a tuple corresponding with pixel sets of the farm region comprising risk value predicted at a time stamp ranging from $t_0$ to $t_n$ for each pixel set of the arrays; and
generate a high-resolution P&D risk map at the sub-farm level from the time series of arrays, the high-resolution P&D risk map comprising a matrix of the pixel sets of the farm region being displayed as shape elements containing fill patterns at the times from $t_0$ to $t_n$,
identify, for each sub-farm of the high-resolution P&D risk map, antidote options;
determine, for each sub-farm, a recommendation score for each of the antidote options based at least in part on the risk value for that sub-farm;
provide, for each sub-farm, one or more recommended antidote options from the antidote options based on the recommendation scores, wherein, for each sub-farm, the antidote options include a plurality of sub-farm temporal antidote options defining antidote options for that sub-farm at a plurality of different points in time from $t_0$ to $t_n$; and display, the high resolution P&D risk map at the sub-farm level as a visual heat-map for each of the sub-farms based on a plurality of user-selected points in time, and wherein one or more recommended antidote options identified for each of the sub-farms is displayed using text on the visual heat-map for each of the user-selected points in time, wherein the one or more recommended antidote options include a location and a time in which the one or more recommended antidote options is to be performed.

18. A computer program product for estimating crop pest risk and/or crop disease risk at sub-farm level and recommending at least one antidote, the computer program product comprising a non-transitory computer readable storage medium having program code embodied therewith, the program code executable by one or more processors, to perform a method comprising:

defining a farm and a farm region using farm definition data in a form of GPS-derived geolocation data obtained from a global satellite-based geolocation system, wherein the farm region encompasses an extended farm encompassing the farm defined by the farm definition data and one or more neighboring farms;

inputting, into a regression learner comprising a plurality of regression models, a course resolution pest and/or disease (P&D) risk profile of the farm and one or more pixel level inputs, wherein the course resolution P&D risk profile of the farm is utilized by the regression learner as a predictor variable of the one or more regression models and includes a risk profile at time=$t_0$ displayed as a shape element representing the farm and a fill pattern within the shape element reflecting an estimation of pest risk or crop disease risk within the farm at the time $t_0$;

outputting, from the regression learner, a time series of arrays based on the one or more pixel level inputs and course resolution P&D risk profile, wherein each of the arrays is a tuple corresponding with pixel sets of the farm region comprising risk value predicted at a time stamp ranging from $t_0$ to $t_n$ for each pixel set of the arrays; and generating a high-resolution P&D risk map at the sub-farm level from the time series of arrays, the high-resolution P&D risk map comprising a matrix of the pixel sets of the farm region being displayed as shape elements containing fill patterns at the times from $t_0$ to $t_n$ identifying, for each sub-farm of the high-resolution P&D risk map, antidote options;

determining, for each sub-farm, a recommendation score for each of the antidote options based at least in part on the risk value for that sub-farm;

providing, for each sub-farm, one or more recommended antidote options from the antidote options based on the recommendation scores, wherein, for each sub-farm, the antidote options include a plurality of sub-farm temporal antidote options defining antidote options for that sub-farm at a plurality of different points in time from $t_0$ to $t_n$, and displaying, the high resolution P&D risk map at the sub-farm level as a visual heat-map for each of the sub-farms based on a plurality of user-selected points in time, and wherein one or more recommended antidote options identified for each of the sub-farms is displayed using text on the visual heat-map for each of the user-selected points in time, wherein the one or more recommended antidote options include a location and a time in which the one or more recommended antidote options is to be performed.

19. The method of claim 1, wherein the matrix of pixel sets of the high-resolution P&D risk map are altered by a user manually applying thresholds upon an ideal distribution resulting in combination or breaking of the pixel sets and generating alternative view of the farm region.

20. The method of claim 1, further comprising:
adjusting, by a reporting engine, one or more thresholds according to different P&D situations for different combinations of crops and P&D to generate a recommended level of resolution for a given P&D situation.

21. The system as recited in claim 7, wherein the matrix of pixel sets of the high-resolution P&D risk map are altered by a user manually applying thresholds upon an ideal distribution resulting in combination or breaking of the pixel sets and generating alternative view of the farm region.

22. The system as recited in claim 7, wherein the program instruction is further executable to:
adjust, by a reporting engine, one or more thresholds according to different P&D situations for different combinations of crops and P&D to generate a recommended level of resolution for a given P&D situation.

23. The computer program product as recited in claim 12, wherein the matrix of pixel sets of the high-resolution P&D risk map are altered by a user manually applying thresholds upon an ideal distribution resulting in combination or breaking of the pixel sets and generating alternative view of the farm region.

24. The computer program product as recited in claim 12, further comprising:
adjusting, by a reporting engine, one or more thresholds according to different P&D situations for different combinations of crops and P&D to generate a recommended level of resolution for a given P&D situation.

* * * * *